US008125988B1

(12) United States Patent  
Sullivan et al.

(10) Patent No.: US 8,125,988 B1  
(45) Date of Patent: Feb. 28, 2012

(54) NETWORK AUDIO TERMINAL AND METHOD

(75) Inventors: Terence Sean Sullivan, Somerville, MA (US); Richard E. Barnett, Newton, MA (US); Terence Brennan, Melbourne, FL (US)

(73) Assignee: RangeCast Technologies LLC, Ely, NV (US)

( * ) Notice: Subject to any disclaimer, the term of this patent is extended or adjusted under 35 U.S.C. 154(b) by 1242 days.

(21) Appl. No.: 11/809,964

(22) Filed: Jun. 4, 2007

(51) Int. Cl.  
*H04L 12/56* (2006.01)  
*H04L 12/26* (2006.01)  
*G10L 11/02* (2006.01)  
*H04B 7/00* (2006.01)

(52) U.S. Cl. .......... 370/389; 381/77; 709/203; 709/219

(58) Field of Classification Search .................. None  
See application file for complete search history.

(56) References Cited

U.S. PATENT DOCUMENTS

| | | | | |
|---|---|---|---|---|
| 5,608,662 | A * | 3/1997 | Large et al. .................. 370/394 |
| 6,014,687 | A | 1/2000 | Watanabe et al. |
| 6,381,314 | B1 | 4/2002 | Walinski |
| 6,389,463 | B2 | 5/2002 | Bolas et al. |
| 6,463,470 | B1 * | 10/2002 | Mohaban et al. ............. 709/223 |
| 6,581,103 | B1 | 6/2003 | Dengler |
| 6,647,389 | B1 * | 11/2003 | Fitch et al. .................... 709/201 |
| 6,934,277 | B1 | 8/2005 | Werve et al. |
| 2001/0027399 | A1 | 10/2001 | Yasushi et al. |
| 2002/0091790 | A1 | 7/2002 | Cubley |
| 2004/0002970 | A1 | 1/2004 | Hur |
| 2004/0019781 | A1 * | 1/2004 | Chari et al. ................... 709/214 |
| 2004/0098341 | A1 | 5/2004 | Urich et al. |
| 2004/0107242 | A1 * | 6/2004 | Vert et al. ..................... 709/203 |
| 2005/0010961 | A1 | 1/2005 | Hagan et al. |
| 2005/0232282 | A1 | 10/2005 | Silver et al. |
| 2006/0126494 | A1 | 6/2006 | Dougall et al. |
| 2006/0287746 | A1 * | 12/2006 | Braithwaite et al. ............ 381/77 |
| 2007/0248314 | A1 * | 10/2007 | Iggulden ........................ 386/68 |
| 2007/0286169 | A1 * | 12/2007 | Roman ......................... 370/352 |

\* cited by examiner

*Primary Examiner* — John Pezzlo  
*Assistant Examiner* — Matthew Campbell  
(74) *Attorney, Agent, or Firm* — Dan Brown Law Office; Daniel R. Brown

(57) ABSTRACT

A network audio receive terminal. A receive terminal includes a network interface that receives network packets and a network packet scanner coupled to the network interface that sequentially scans received network packets in accordance with scan criteria. A content selector is coupled to the network packet scanner, and selects network packets containing units of audio content from the scanned network packets based on selection criteria, including pertinence data. An audio content processor is coupled to the content selector, and processes the audio content in the selected network packets. The network packets may include directory packets containing audio content addresses, in which case, the content selector further selects directory packets based on selection criteria. An audio packet requestor requests audio packets through the network identified by the audio content addresses that correspond to the selected directory packets.

49 Claims, 9 Drawing Sheets

NETWORK AUDIO TERMINAL AND METHOD

BACKGROUND OF THE INVENTION

1. Field of the Invention

The present invention relates to network coupled audio communications. More specifically, the present invention relates to network terminal apparatus and methods for coupling audio content from a local audio source into a network and for receiving audio content from the network or a local audio source.

2. Description of the Related Art

A first co-pending U.S. patent application Ser. No. 11/418, 960 to Barnett et al. filed on May 5, 2006 (hereinafter "Barnett-1") for an Internet Audio Scanner and Method, the contents of which are hereby incorporated by reference, was submitted by the inventors hereof. Barnett-1 discloses an apparatus and method for processing signals produced by signal sources, including a first signal source that is a first server of streaming audio signals, which include intermittent audio content, and which is located at an address on a network. The apparatus includes a network interface and a processor that selects the first signal source by outputting the address of the first server to the network interface, thereby establishing a network connection. The apparatus also includes a threshold detector coupled to receive streaming audio signals through the network interface, and that has a detector output with an active state that indicates that the intermittent audio content presently meets a threshold value. The processor further couples the streaming audio content to an output circuit if the detector output is active. Where there are plural intermittent signal sources, the apparatus of Barnett 1 can sequentially monitor the plural sources and process the audio content based upon the threshold detector output.

A second co-pending U.S. patent application Ser. No. 11/600,476 to Sullivan et al. filed on Nov. 16, 2006 (hereinafter "Sullivan-1") for a Network Audio Directory Server and Method, the contents of which are hereby incorporated by reference, was submitted by two of the inventors hereof. Sullivan-1 discloses a system and method of communicating audio through a network. Sullivan-1 addresses the structure and techniques employed in the network environment. The method includes detecting audio content from an audio source by a first network terminal, sending a directory packet including a network address of the detected audio content to a second network terminal, and requesting the audio content through the network by the second audio terminal. The further step of storing the detected audio content in a buffer for audio packets identified by packet identities is added in some embodiments. The sending of a directory packet step may include sending a packet identity, and the requesting step may include specifying an audio packet according to the packet identity. A further step of sending a source packet including the network address of the detected audio content to a network directory server by the first network terminal may be added. Thusly, the directory server manages the requests and communication of audio content between feed source terminals and receiver terminals.

It is envisioned that the novel apparatus and method of Barnett-1 will be adopted in the market and will grow to a very large number of signal sources throughout the Internet. As the number of available signal sources increases, challenges will arises for consumers of the audio content as to how to monitor and select the ever increasing receiving and listening options. Sullivan-1 partially addresses this demand through application of the directory server system and method, which provides a network fabric for managing audio content distribution within the network. In this environment, it will be appreciated that users have the ability to access a wide range or audio content sources across a wide area network. Individual users will be able to both receive audio content from distance feed sources and will be able to feed locally sourced audio content into the network for other users to access, through application of the aforementioned teachings. Thus, it can be appreciated that there is a need in the art for a range of network terminal apparatus and methods for coupling audio content into the network and for receive access of audio content from the network, or both.

SUMMARY OF THE INVENTION

The present invention teaches a network audio receive terminal. The terminal includes a network interface that receives network packets and a network packet scanner coupled to the network interface that sequentially scans received network packets in accordance with scan criteria. A content selector is coupled to the network packet scanner, and selects network packets containing units of audio content from the scanned network packets based on selection criteria. An audio content processor is coupled to the content selector, and processes the audio content in the selected network packets.

In a specific embodiment of the forgoing terminal, wherein the network packets include directory packets containing audio content addresses, the content selector further selects directory packets based on selection criteria. An audio packet requestor is coupled to the content selector and the network interface, and operates to request audio packets through the network identified by the audio content addresses that correspond to the selected directory packets. The audio content processor processes the audio content in the requested audio packets.

In a specific embodiment of the foregoing terminal, the network interface is a wireless transceiver. In another specific embodiment, the network packets are Internet protocol compliant packets. In other specific embodiments the scanner sequences network packets by source address, by time, by predetermined priority, or according to a data reference field. In other specific embodiments, the selection criteria distinguishes units of audio content by signal quality, by source address, by user preferences, or by packet data reference fields. In other specific embodiments, a unit of audio content is an audio data file, a continuous stream of related audio packets, or an individual transmission selected from an intermittent stream of audio transmissions.

In other specific embodiments of the foregoing terminal, the audio content processor includes a digital to analog converter or a memory buffer. In another embodiment, wherein the audio content processor includes a memory for storing a sequence of related units of audio content, the terminal includes a means for reproducing the sequence of related units of audio content in time ordered sequence. The time ordered sequence can be compressed by removing a portion of the quiet intervals between units of audio content. In a refinement to these embodiments, the audio content processor interrupts the time ordered reproduction sequence to reproduce audio content from a second audio source.

In a specific embodiment, the foregoing terminal also includes a local source interface, for connection to a local audio source, which is coupled to the content selector. The content selector selects local audio content based on the selection criteria. In a refinement to this embodiment, the local source interface includes a data communication channel for communicating audio content related data with the local audio source. In another specific embodiment, the foregoing terminal includes a user interface having a data entry actuator for entering scan criteria and selection criteria. In another embodiment, the selection criteria are received by the network interface.

In a specific embodiment of the foregoing terminal, the network packet scanner simultaneously scans network packets from plural sources. In a refinement to this embodiment, the audio content processor reproduces audio content from a first audio source while the network packet scanner continues to scan for network packets from a second audio source. In a further refinement, the content selector selects one of plural simultaneous units of audio content based on priority data. The priority data may be geographically based. In another specific embodiment, the foregoing terminal further includes a display coupled to display data related to the audio source. In another embodiment, the scan criteria include user entered preference directing scanning sequences.

The present invention teaches a network audio feed source terminal, for coupling units of audio content from an audio source to a network. The terminal includes a source interface that receives audio content from the audio source and a content monitor that identifies audio content in accordance with monitoring criteria. The terminal also includes a means for capturing a selected portion of the identified audio content as units of audio content in accordance with capture criteria, and, a network interface that couples the units of audio content into the network.

In a specific embodiment of the foregoing feed source terminal, the source interface includes an analog to digital converter. In another specific embodiment, the source interface further includes a data communication channel that communicates audio content related source data with the audio source. In a refinement to this embodiment, the source data includes source commands for controlling operation of the audio source.

In a specific embodiment of the foregoing feed source terminal, the monitoring criteria is the audio signal quality, a squelch threshold, a source data reference field, or a predetermined user preference. In other specific embodiments, the means for capturing is a memory, a communications link, or a protocol converter. In other specific embodiments, the capture criteria is signal quality, squelch threshold, a source data field, a predetermined user preference, a predetermined priority, or the source type. In other embodiments, a unit of audio content is an audio data file, a continuous stream of related audio packets or an individual transmission selected from an intermittent stream of audio transmissions.

In a specific embodiment of the foregoing feed source terminal, the network interface is a wireless transceiver. In other specific embodiments, the network interface is compliant with one of a local area network, a wide area network or the Internet. In another specific embodiment, the network interface couples data related to the audio content into the network.

In a specific embodiment, the foregoing feed source terminal includes plural source interfaces coupled to plural audio sources. The content monitor and the means for capturing monitor and capture units of audio content from the plural audio sources and the network interface outputs a composite stream of units of audio content to the network.

The present invention teaches a network audio feed source terminal, which couples network audio packets containing audio content and network directory packets containing audio content addresses into a network. The feed source terminal includes a source interface that receives audio content from the audio source and a content monitor that identifies audio content in accordance with monitoring criteria. Also, an audio content buffer that is accessible through a network address, and that captures and stores the identified audio content as units of audio content in accordance with capture criteria. A directory packet generator generates directory packets, which include network addresses corresponding to the stored units of audio content. Finally, network interface that communicates the network directory packets into the network, and that receives audio packet requests from the network, and which further communicates recalled corresponding audio packets from the audio content buffer into the network.

The present invention also teaches a method of receiving network audio content by a network terminal having a network interface and an audio processor. The receiving method includes receiving network packets through the network interface and sequentially scanning the received network packets in accordance with scan criteria. Then, selecting network packets containing units of audio content from the scanned network packets based on selection criteria, and processing the audio content in the selected network packets by the audio content processor.

In a specific embodiment of the foregoing receiving method, wherein the network packets include directory packets containing audio content addresses, the following steps are added. These include, selecting directory packets based on selection criteria, requesting audio packets through the network identified by the audio content addresses that correspond to the selected directory packets, and processing the audio content in the requested audio packets by the audio content processor.

In specific embodiments of the foregoing method, the scanning step sequences network packets by source address, by time, by predetermine priority, or according to a data reference field. In other specific embodiments, the selecting step distinguishes units of audio content by signal quality, by source address, by user preferences or by packet data reference fields.

In specific embodiments of the foregoing method, the processing step further includes digital to analog conversion or storing the audio content in a memory buffer. In another specific embodiment, the processing step further includes storing a sequence of related units of audio content and reproducing the sequence of related units of audio content in time ordered sequence. A refined embodiment includes the further step of compressing the time ordered sequence by removing a portion of the quiet intervals between units of audio content. In another refinement, the further steps of interrupting the time ordered reproduction sequence, and reproducing audio content from a second audio source are added.

In a specific embodiment of the foregoing method, a local audio source is coupled to the network terminal, and the method further includes selecting local audio content based on the selection criteria. In a refinement to this embodiment, the step of communicating audio content related data with the local audio source is added. In another specific embodiment, the method includes entering scan criteria and selection criteria into the network terminal. In another embodiment, the method includes receiving the selection criteria through the network interface.

In a specific embodiment, the foregoing method includes simultaneously scanning network packets from plural sources. In a refinement to this embodiment, the method includes the steps of reproducing audio content from a first audio source, and simultaneously scanning network packets from a second audio source. In a further refinement, the method includes the step of selecting one of plural simultaneous units of audio content based on priority data.

The present invention teaches a method of coupling units of audio content from an audio source into a network using a network terminal having a network interface. The method includes the steps of receiving audio content from the audio source and monitoring to identify audio content in accordance with monitoring criteria. Then, capturing a selected portion of the identified audio content as units of audio content in accordance with capture criteria, and coupling the captured units of audio content into the network.

In a specific embodiment of the foregoing method, the further step of communicating audio content related source data with the audio source is added. In a refinement, the method includes the step of controlling operation of the audio source.

In specific embodiments of the forgoing method, the monitoring criteria are audio signal quality, a squelch threshold, a source data reference field, or a predetermined user preference. In other specific embodiments, the capturing step includes storing the audio content in a memory, coupling the audio content to a communications link, or converting the protocol of the audio content. In other specific embodiments, capture criteria is signal quality, a squelch threshold, a source data field, a predetermined user preference, or a predetermined priority. In another specific embodiment, the foregoing method includes the steps of receiving audio content from plural audio sources, monitoring and capturing units of audio content from the plural audio sources, and outputting a composite stream of units of audio content to the network.

The present invention teaches a method for coupling network audio packets containing audio content and network directory packets containing audio content addresses into a network using a network terminal with a network interface. The method includes receiving audio content from an audio source and monitoring to identify audio content in accordance with monitoring criteria. Then, capturing a selected portion of the identified audio content in accordance with capture criteria and storing the captured audio content as units of audio content in a content buffer addressable by network addresses. Then, generating directory packets including network addresses corresponding to the stored units of audio content, and communicating the network directory packets into the network through the network interface. Finally, receiving audio packet requests from the network, and communicating recalled corresponding audio packets from the audio content buffer into the network.

DESCRIPTION OF THE INVENTION

Figure 1:
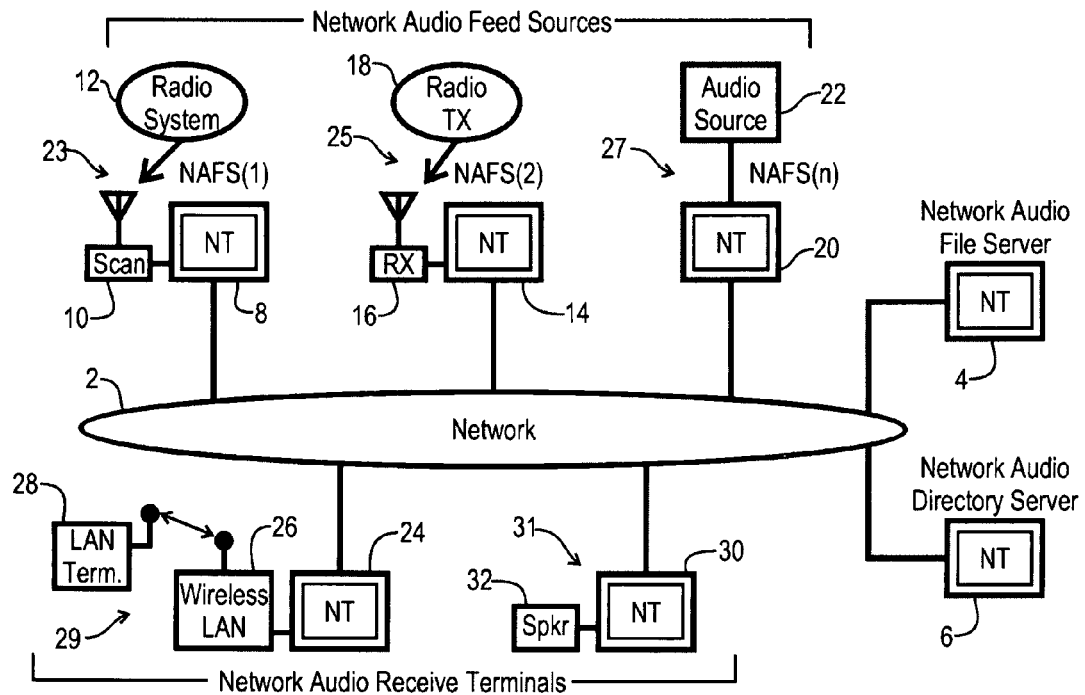
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods and components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Reference is directed to FIG. 1, which is a system diagram according to an illustrative embodiment of the present invention. A network 2, such as the Internet, couples plural network terminals together for communications according to a network communications protocol, such as the TCP/IP family of protocols, which are known to those skilled in the art. Plural network audio feed sources 9, 11, 13 gather audio content and are coupled to the network 2. By way of example, and not limitation, the first NAFS 9 comprises a network terminal 8, such as a personal computer, coupled to a radio scanner 10, as are known to those skilled in the art. In another embodiment, the network terminal 8 and the scanner 10 are formed into a single portable unit, which comprises both functions and may include wireless access to the network 2. The scanner 10 monitors radio signals emitted from one or more radio systems 12 for the presence of audio content. When pertinent audio content is detected, a squelch circuit couples audio content to the network terminal 8. The audio content may be combined with pertinence data, such as radio frequency data, talk group data, radio service descriptors, priority data, time stamps or any other pertinent data, which may also be referred to as source data. This information may be forwarded into the network 2, or it may be buffered with a portion of the information forwarded into the network. Destinations for such information are other network terminals. The second NAFS 11 is another example, which includes a network terminal 14 coupled to the network 2. A radio receiver 16 couples audio content and pertinence data to the network terminal, which is received from a remote radio transmitter 18. The second example is typical for applications where the broadcast frequency of the radio source 18 is known. The third NAFS 13 is an example than enables coupling of any audio source 22 to a network terminal 20, which is coupled to the network. The network terminal 20 or the audio source 22 may also provide pertinence data together with the audio content. The audio content may be continuous or intermittent in nature. In the third example, the audio source 22 is typically coupled directly to the network terminal 20, such as a microphone, audio communication circuit, or audio recording or reproduction device.

In FIG. 1, one or more network audio directory servers ("NADS") 6 are coupled to the network 2. The NADS 6 includes a network terminal 6, such as a personal computing device or other type of network server. The NADS 6 receives information from the plural NAFS 9, 11, 13, which may include all or a portion of the audio content and pertinence data. The NADS 6 processes the data and assembles a directory stream of data that is transmitted back into the network 2. The directory stream indicates the availability of audio content that is accessible through the network 2. The location of the available audio content may be in the NADS 6, in any of the NAFS 9, 11, 13, in a file server computer 4, or any combination thereof. The specific locations are identified using network addresses. The network audio file server 4 is illustrated, which provides storage, forwarding, and mirroring services for audio content, pertinence data, and other system functions that will be more fully discussed hereinafter.

Plural file servers may also be employed in the network topology. The directory streams are selectively received by plural network audio receive terminals ("NART") 15, 17. Although two NART's 15, 17 are illustrated, the present invention contemplates any number of NART's in the system. By way of example and not limitation, the first NART 17 comprises a network terminal 30 having an audio reproduction circuit coupled to a loudspeaker 32. The NART 17 monitors the directory stream for pertinent content, which is user and system definable, and then accesses the pertinent content through the network 2 using network addressing. The second NART 15 is an example of providing a wireless access point, such as an Internet Wi-Fi access point for enhanced accessibility of the audio content and pertinence data. The NART 15 comprises a network terminal 24 that is coupled to the network 2. The network terminal 24 is coupled to a wireless local area network ("WLAN") transceiver 26, which communicates wirelessly with one or more WLAN terminals 28. Those of ordinary skill in the art will appreciate that any type of network terminal currently known or later developed can be used in conjunction with the teachings of the present invention.

The present invention encompasses a variety of network audio terminals, including network audio feed sources (NAFS), network audio receive terminals (NART) and combinations terminals that provide both functions. Combination terminals are quite useful in implementing a wide are network audio distribution system because they enable typical users to scan and receive network fed audio content and local audio content simultaneously, and, enables the typical user to act as a feed source for other typical users. Within the scope of the present invention, there are a variety of terminal, types that operate to communicate several types of audio content. Audio content may be produced in the form of a continuous stream of audio packets corresponding to a real time streaming audio source. And example of continuous stream audio is a broadcast radio station that streams its content into the Internet, implementing an Internet radio station. Another type of audio content is an intermittent stream of audio packets. An example of this is the case where a scanning radio receiver couples its squelched discriminator output into the Internet. Audio content is communicated in bursts of audio packets that correspond to push-to-talk bursts of communications, familiar in land mobile two-way radio communications. Both of these types of audio content tend to be communicated using a connection-based network channel. With an intermittent stream of content, the NAFS may send periodic keep-alive packets during quiet intervals, so as to keep the connection active according to minimum network protocol standards. Another type of audio content is the audio file. Audio files tend to be applicable in the case where content is distributed in non-real time. Or in cased where more extensive network latency is acceptable. Audio file based content can be communicated as a single large file, or can be subdivided into a group of separately communicated smaller files. It is understood that network communications are commonly addressed based in that the source and destination are identified using network addresses, and that each packet communicated includes the source and destination addresses that are used during network routing of the packets.

Audio content can be stored, or buffered, at locations within the network and then requested from time to time by network terminals. This environment supports the aforementioned use of network directory servers. With a directory server, a directory stream including network addresses of audio content is sent out to other network terminals. Either a NART or a NAFS can also function as a directory server.

Receiving terminals can request audio content based on network addresses found in the directory stream. Then, the terminals send an audio request to the buffering terminal, and ultimately the desired audio content is sent to the requesting terminal as one or more audio packets. The playback or other reproduction of the received audio files can be accomplished as a real-time sequence, or, can be time-compressed to remove quiet internals in the audio content.

Figure 2:
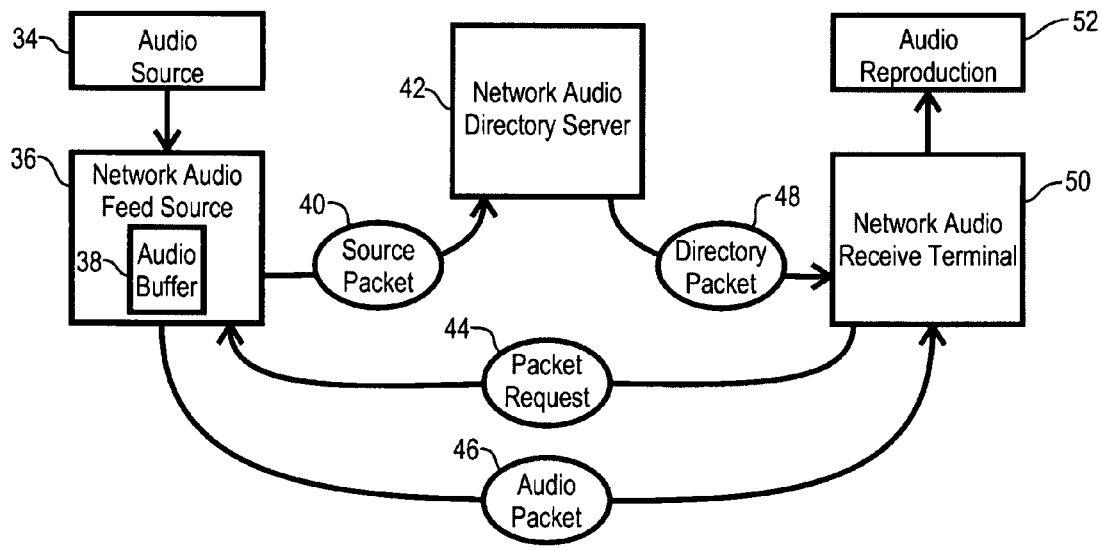
FIG. 2 is a system functional block diagram according to an illustrative embodiment of the present invention.

Reference is directed to FIG. 2, which is a system functional block diagram according to an illustrative embodiment of the present invention. FIG. 2 illustrates the arrangement of the network packets communicated between generalized and exemplary network terminal types. Ultimately, the system goal is to gather audio content from an audio source 34 and reproduce it at a point of audio reproduction 52. The present invention teaches the various network terminal types that are employed to address the issues of dealing with a wide variety of terminal types and audio content that are potentially available to consumers, and the issues surrounding the selection of such content that is pertinent to particular consumer's interests. FIG. 2 illustrates one embodiment that addresses these issues. Information is created at, or originates from, an audio source 34, which is coupled to a NAFS 36. In this illustrative embodiment, the NAFS 36 includes an audio buffer 38, where audio content is stored according to network addresses. In other embodiments, the audio buffer may be located in other terminals in the network. As audio content is received from time to time, the NAFS 36 does two things. First, it buffers the audio content into the audio buffer 38 inside of network addressable files, databases, packets or similar data structures. Second, the NAFS 36 sends a source packet 40 to a network audio directory server ("NADS") 42. The source packet 40 includes pertinence data about the audio content that is stored in the audio buffer 38, but, in this illustrative embodiment, does not include the audio content itself. This arrangement serves the first purpose of limiting the amount of data transferred while still notifying consumers of the availability of the audio content according to its pertinence data.

The NADS 42 transfers or transforms the source packet 40 data into a directory packet 48, which is communicated to one or more NART's 50. The transformation process may include culling pertinent portions of the source packet pertinence data, and may include the addition of some NADS generated pertinence data to the directory packet 48. An example of this would be to add priority data, which could elevate or reduce the priority rating of the audio content represented by the source packet. The directory packet 48 may be a part of a stream of directory packets, which is called a directory stream. The directory stream typically includes directory packets with pertinence data for plural NAFS's, each of which receives audio content from their respective audio sources. In the illustrative embodiment, the NART 50 includes a selection process that is tailored to the consumer's interests with respect to what kinds audio content are desirable to reproduce. A simple example of this would be to reproduce audio packets received from the police department of a particular jurisdiction. If one or more directory packets satisfy the selection requirements, then the NART 50 communicates a packet request 44 to the NAFS 36 where the addressable buffer 38 is located. The packet request 44 addresses the network address of the audio content identified in the selected directory packet. In response to the packet request 44, the NAFS 36 recalls the selected audio content from the audio buffer 38, and forwards the audio packet 46 to the NART 50. Finally, the NART 50 reproduces the audio content using an audio reproduction process 52. This arrangement serves the purpose of only sending the bulk of audio content to the NART that specifically request such content. With respect to the concept of a "packet", those skilled in the art will appreciate that this terminology exhibits a range of flexibility that is dependent upon the network architecture, system bandwidth, processing speed and other factors. At an abstract level, a "packet" can be a block of data being transmitted over a network, or the same encapsulated data managed by a network terminal or other device during assembly for transmission or disassembly upon receipt. In addition, a packet can be any block of data, plural related blocks of data, or files that are stored on a server as files that are available for download. A file is generally a larger agglomeration of data than a packet. Similarly, such information may be stored in a database structure, which will generally associate content with pertinence data and allow for efficient storage and retrieval of the content. Addressing, and network addresses are dependent upon the network model and addressing scheme, as will be appreciated by those skilled in the art. In the case of an Internet model, employing the TCP/IP family of protocols, the uniform resource locator ("URL") is one appropriate addressing designator, as are absolute IP addresses. The system architecture depicted in FIGS. 1 and 2 is intended to be exemplary. Other more complex arrangements of the teachings herein can be readily conceived. For example, a single receiving terminal (NART) could receive more than one directory stream, and filter these streams according to selection rules to select audio content and segments for reproduction and playback. In one example of this arrangement, a service company operates a national directory stream, while someone in a local community operates a stream focused on channels of local interest. The NART operates as a scanner that is configured to pick up both streams of information. In another example, where NAFS and NADS are the same computer, each terminal operates as a scanner to produce a low-bandwidth directory stream that notifies the NARTs of activity, and where the NART connects to each combined NAFS and NADS directory stream independently, thereby allowing user-to-user operations without a central NADS while keeping the benefit of low bandwidth, including not sending audio content that is not of interest to particular listeners. In both of these exemplary embodiments, the NART monitors more than one directory stream, but each directory stream itself follows the operation and structure described in the application.

In the previously described illustrative embodiments, the NAFS, NART, NADS and generalized network structure have been introduced. Also, several types of audio content have been introduced. Those skilled in the art with anticipate that there will be a broader range of combinations and permutations of audio content, distribution, selection, and terminal types covered under the teachings of the present invention. In fact, there is a subtle integration of the terminal types and the processes of identifying audio content, selecting, distributing and ultimately reproducing audio content. It is useful to establish some terminology used to describe the terminal types and the various functions they provide, as applied to the various kinds of audio content and the various ways that it may be routed, buffered, and processed. A receive terminal is a network audio "scanner" that a consumer uses to access audio content through a network, and optionally, accessing locally gathered audio content. Stated another way, a receive terminal is a unit of product that enables a consumer to receive, scan, select, and reproduce audio content. A receive terminal may be implemented in a number of configurations. At one end of the spectrum is a dedicated hardware device that has the appearance of a conventional radio scanner. At the other end of the spectrum, a receiver terminal is a software application that executes on a personal computing or wireless device. Audio content, pertinence data, also called source data, and directory streams can be received by a receive terminal. Audio content can arrive and be processed in real time, and can include content from plural audio sources, with or without related pertinence data. Reproduction time management includes buffering and selection of audio content. Audio content can be requested by the receive terminal based on a directory stream, pertinence data, and user preferences in a selection process implemented in the receive terminal. For example, while audio content from a first feed source is being reproduced, audio content from a second audio source may arrive that has a higher priority, based on pertinence data, for example. The content from the first source is then buffered in the receive terminal so as to enable real-time reproduction of the content from the second source. Upon completion of the reproduction of the audio from the second source, the buffered content from the first source is then reproduced in real time. Alternatively, to prevent the interruption of any single transmission, content from the second source is buffered for playback when playback from the first source is complete, but where the priority transmission is given precedence for playback at this time relative to other transmissions that have lower priority.

A feed source is a network terminal that communicates audio content into the network. A feed source is a unit of product that enables a user to monitor, capture, and communicate audio content into the network. It should be noted that the single network terminal can include both feed source and receive terminal functionality, referred to herein as a combined terminal. The physical implementation of a feed source can be based on a radio receiver, a radio scanner, a trunked radio scanner, a wireless terminal, a personal computing device, or any other network terminal device known to those skilled in the art. The receive terminal can include an audio content squelch detection circuit for identifying audio content within an intermittent stream of audio content. The audio feed source coupled to a receive terminal can provide feed source related data that is added as a data tag of pertinence data by the feed source to the audio stream it couples into the network. Pertinence data can be added as the audio content is captured by the feed source terminal. The combination of audio content and pertinence data may simply be referred to as content. The feed source adds network communication overhead to the content, so as to conform to the host network protocol requirements. In the case of a directory stream fed from the feed source, the audio content is buffed in the feed source.

Several functional components are combined together to create a network terminal. The components perform functions on information as it passes through the terminals. Generalized terminology is useful to establish a framework for subsequent discussions. A source is a thing or a channel from which one or more items of content are received. For example, a radio receiver, a radio scanner, an audio device, a microphone, and a network interface are all examples of sources of audio content and pertinence data. A network interface is a device or circuit that physically couples a terminal to a network. A serial port, parallel port, Ethernet interface, Wi-Fi transceiver, Bluetooth transceiver, modem, phone line jack, and simple wire terminals are all examples of a network interface. A network is anything that couples two or more terminals together. An RJ-11 cable, an RJ-45 cable, any communication link, a token ring network, an Ethernet router, TCP/IP network, WAN, and LAN are examples of networks. Content, or audio content, are audio signals in any form, including analog, digital, continuous, intermittent, streamed, stored and so forth.

With respect to the functions performed in network terminals, distinct terminology is useful for the different terminal types. As noted hereinbefore, a network audio feed source terminal monitors, captures and communicates audio content and pertinence data. Monitor means that a feed source receives content through any means. Capturing means performing some process on the monitored content, such as storing it, forwarding it, communicating it, translating it, altering it, and so forth. Whether or not monitored content is captured may be dependent on whether a receive terminal has requested the content, or type of content, in advance. The term communicate means to convey all or a portion of captured content to or from a terminal. A receive terminal, on the other hand, scans, selects and reproduces audio content and pertinence data, also referred to as source data. To scan or scanning means to receive plural items of content, either sequentially or simultaneously, from one or more sources. Thus, the items of content may be separated in time, by addresses, by communication channel, physical interface, or other means. To select, or selection, means the process or conditions used to discriminate preferred content, including threshold detection, pertinence, priority, geographic references, and any other means of discriminating one item of content as preferred over another item of content. To reproduce or reproduction means to convert content for a man-machine interface, such as digital to analog conversion, amplification, filtering, acoustic transducing and so forth.

For each of the three principal audio source types, which include a streaming audio source, intermittent audio feed source and a buffered file audio feed source, there are variations in the way that each network terminal handles the flow of audio content, pertinence data, and network routing. Note that each type of network terminal may process various kinds of audio content simultaneously. As noted hereinbefore, a streaming audio sources operates in a similar fashion to Internet radio. For a broadcast radio source, the NAFS streams radio receiver discriminator output from a URL (uniform resource locator) addressable server. No squelch function provided. In operation, both NADS and NART terminals address by URL of the streaming source and establish streaming audio connection. Audio content must be accepted in real time. Note that because the source is a streaming source does not necessarily mean that there is always desirable content being communicated. There may be quiet intervals, where some kind of squelch function would be beneficial. Accordingly, a directory servers (NADS) may be employed to receive the streaming content, perform squelch operation, parse and packetize the active audio content, buffers the packets, assembles the directory packets, and transmits the directly packets. This action essentially translates streaming audio content into intermittent audio content. For a streaming audio source, the receive terminal (NART) operates to monitor the audio content by "tuning" to the URL of the streaming audio source for continuous monitoring of the content.

In the case of an intermittent audio feed source, the NAFS provides the squelch function to the raw audio source and then streams only the active signal content. The intermittent source is addressed by URL to establish streaming connection to NADS or NART terminals. Keep-alive packets may be sent during quiet intervals to maintain streaming links. Typically, there is no buffering of active audio content, so receiving terminals must receive content in real time. If a directory server is involved, the NADS receives the intermittent content, parses and packetizes the active audio content, buffers the packets, assembles the directory packets, and transmits the directly packets. A typical NART operates to monitor the audio feed by "tuning" to the URL or IP address of the intermittent audio source for continuous real-time monitoring of the intermittent content.

In the case of a buffered audio feed source, where audio content is stored as packets or files in a memory buffer, the terminals function as follows. The NAFS provides the squelch function and then buffers the active audio content as individually addressed packets or files. Source packets, without audio content, are sent in real time, and, audio packets can be requested and are transmitted from the buffer to requesting terminals. The NART monitors a directory packet stream, responds to pertinent directory packets by requesting corresponding audio packets from the URL contained therein.

Figure 3:
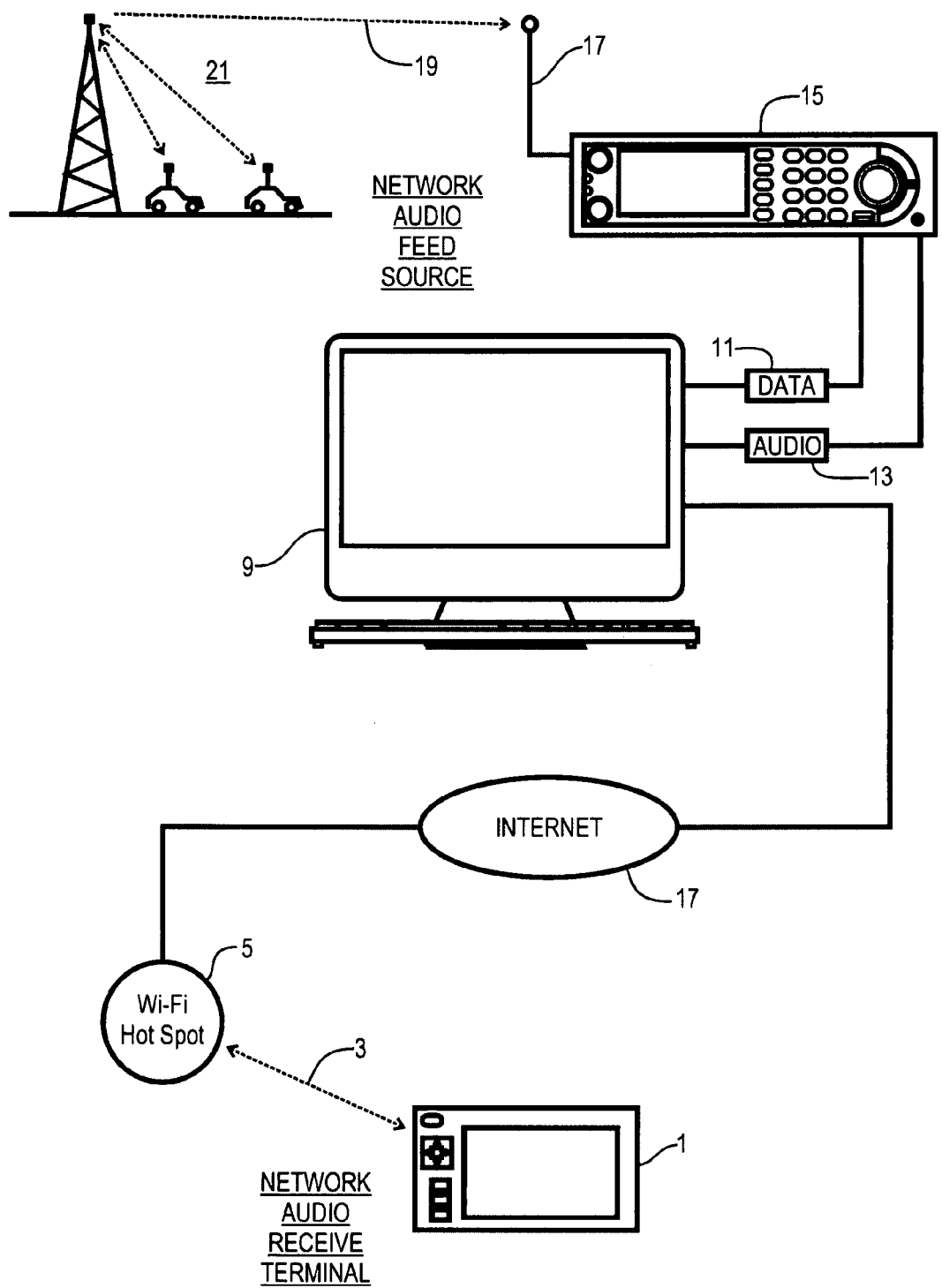
FIG. 3 is a system diagram according to an illustrative embodiment of the present invention.

Reference is directed to FIG. 3, which is a system diagram according to an illustrative embodiment of the present invention. The system illustrated in FIG. 3 represents an end-to-end embodiment of a prototype systems implemented in development of the present invention. The client terminal 1 functions as the NART, which accesses the Internet 17 through an IEEE §802.11(g) wireless interface 3, commonly referred to as a Wi-Fi hot spot 5. The NAFS 9 is an IBM compatible personal computer 9 that has sound card (not shown) audio interface 13 and a serial port data interface 11 coupled to a Uniden model BCT15 trunked scanning radio receiver 15. In the development test, the NAFS 9 also operated as a NADS, providing a directory stream to the NART 1 through the Internet 17. The receiver 15 intercepts communications 19 from a public safety trunked radio system 21 using a suitable antenna 17. The client terminal 1 is a Nokia model '770' portable wireless Internet terminal with an audio user interface, a touchpad display screen, and provides a readily accessible programming environment, running the Linux operating system.

The client terminal 1 in FIG. 3 was programmed to incorporate the NART functionality in the Python programming language, which is an interpreted language executable in the Linux operating system of the Nokia 770. Python is a function-based scripting language, somewhat similar to C, Perl or PHP. It should be noted that the NART functionality could be implemented in JAVA, as a webpage that would not require installation of any downloaded software. The software is implemented as four parallel programs or threads, so that certain parallel operations can be conducted simultaneously. The software is centered on a single "main" program, (M) which opens a graphical user interface (using PyGTK, an extension of Python that supports a platform-independent GUI structure), opens a socket connection to the directory server, parses incoming directory packet messages, maintains a history list of known available transmissions reported by the directory server, maintains another list of these transmissions that have already been downloaded and are available for immediate reproduction on demand, and selects audio files for download and play based on user-defined selection criteria. The other three assistant programs are relatively simple, and perform specific time-intensive or timing functions that can be separated from the main program. These programs run in parallel, with each assistant program having a socket connection to the main program (M) to coordinate activities. One assistant program, (D), manages downloading of audio files from the NADS 9 to the client terminal 1. Python includes a command to download a file from a URL but the process blocks (suspends execution of other program functions until the download is complete). Isolation of this blocking function into an small assistant program (D) allows for downloading in the background from the perspective of the main program (M), so that reproduction of other content may be initiated, and user interface elements may remain responsive, while downloading audio content.

The main program (M) is entirely event-driven, and executes code in response to external events such as receipt of a packet from the directory server, notification from an assistant program (D) that a download is complete, notification from an assistant program (S) that the sound system is ready to receive a new audio reproduction command, or user interface operations. Some operations desirable in the main program (M) depend on timing information, such as waiting after initiating an audio reproduction request (by socket to program S) by an estimated audio startup interval before posting text information about the transmission on the GUI, so that presentation of aural and visual information regarding a single file is nearly simultaneous. A final assistant program (R) produces a regular series of timing events, via the socket connection to the main program (M), providing the main program with opportunities for executing code that is desired to execute at known times not coincident with an otherwise available event trigger.

The main program (M) maintains a history list of known available transmissions reported by the directory server, implemented as an array or list with entries specified by a time-ordered numerical index. The user interface allows for marking certain audio sources as "priority" sources, to be given higher priority over content from other audio sources. The program maintains two time index variables, one for normal audio segments, another for "priority" audio segments. These time index variables represent the current leading edge of audio reproduction for the associated class of audio files. The main program frequently executes a "Sound Select" function to answer the question "under the current selection criteria, with the current list of transmissions reported by the directory server, and the current time index values, what transmission should be reproduced next?" This "Sound Select" function is executed in response to events from the user interface (since the selection criteria may have been changed), receipt of a packet from the directory server (since a newly reported transmission may fall within the selection criteria), notification from an assistant program of newly downloaded content (because it may be appropriate to immediately initiate reproduction of this newly downloaded content), or notification from an assistant program that the sound system has become free and is now ready for initiation of another audio file reproduction (since there may be additional audio for reproduction pending availability of the sound system). To answer the question of what transmission should be reproduced next, the list of transmissions reported by the directory server is scanned from a time index towards the end of list to identify the first transmission falling within the selection criteria. This scan is performed first with the priority time index, and if no match is found, a similar sweep is performed with the normal time index. For each sweep, only transmissions within the selection criteria that match the appropriate class (priority or normal) are considered valid matches. If no matching transmission is found in a sweep, the time index is moved to the end of the list, reflecting the fact that all intervening transmissions have been tested and skipped. When this test to identify a transmission that should be played next identifies a specific transmission, additional steps may be taken. On some occasions, a specific transmission is identified which has not been downloaded, and in this case a request is sent via socket connection to the assistant program responsible for downloading audio content (D) to obtain the file and notify the main program when the download is complete. On some occasions, a specific transmission is identified which has already been downloaded and is available locally for playback. In this case, if the assistant program responsible for reproduction of audio content (S) is not currently busy, a request is sent via socket connection to this assistant program to initiate reproduction of this audio file. Due to the central role of this "Sound Select" function in initiating requests to assistant programs for downloading or reproducing audio content, this function is largely responsible for the coordination of the constellation of programs used in the exemplary embodiment on the Nokia 770 platform.

Under ordinary conditions, download of audio files is faster than reproduction of audio files. However, there may be times when the downloading of files becomes slow or impossible, for example, due to a poor wireless connection. In addition, the download of unusually large audio content files may take an abnormally long time. For these reasons, it may be desirable to "look ahead" and download additional audio content, beyond the transmission that should be reproduced next. When the download module is free, and the next transmission that should be reproduced has already been downloaded, the main program (M) may request the download of another transmission matching the selection criteria so that additional audio will be available for local playback. If local storage capacity is limited, audio files may be deleted after they are reproduced, and "look ahead" downloading may be limited or omitted. More generally, audio files may be deleted on program entry or exit, to prevent files from accumulating. While priority is described in this exemplary embodiment as a feature distinguishing certain audio sources as having priority relative to others, it is evident that multiple levels of priority may be implemented, or that priority transmissions may be distinguished by characteristics other than the presence of the audio source in a priority list. To give one example, priority may be granted to follow-up transmissions on the most recently received audio channel, for continuity of conversations that are broken into multiple transmission elements. More generally, priority may derive from various elements, or combination of elements, within the pertinence data and the audio reproduction context and history.

Another assistant program (S) manages reproduction of audio content from audio files to the Nokia 770 user interface. The Nokia 770 can execute the GSTREAMER audio playback library, including a command line interface for initiating playback of an audio file. Python provides means for calling GSTREAMER via an operating system function call. However, the GSTREAMER process blocks (suspends execution of other program functions for the duration of audio playback). Isolation of this blocking function into an small assistant program (S) allows for reproducing audio in the background from the perspective of the main program (M), so that downloading of other content may be initiated, and user interface elements may remain responsive, while audio is being reproduced. The sound system is typically platform and hardware dependent, and for use on other systems besides the Nokia 770, an appropriate sound reproduction command may be selected that is available and commonly used on the target device. A variety of typical sound reproduction commands may be coded into the software, and selected by a startup parameter when the program is executed, or automatically selected by hardware or operating system auto-detection means.

The main program (M) controls the graphical user interface. The display includes a text display panel, two sets of buttons (above and below the text display panel), and a time slider control. A normal reception mode emulates a traditional scanner display. On the text display panel, for each transmission that is reproduced, corresponding information is shown including an agency text tag, frequency, time and date of the transmission, and duration of the transmission. This information includes pertinence data received from the scanner 15. This corresponding text information is approximately synchronized to aural reproduction, with the timing of the posting of text information taking into account typical GSTREAMER startup delays between the initiation of a request for audio reproduction and the actual start of audio reproduction. The timing of the clearing of this text information may be coincident with a socket report from the sound program (S) that the sound system is free, or if there is a typical offset between GSTREAMER blocking and actual aural reproduction, a delay may be instituted between this socket report and clearing of the display. The time slider widget reflects the current position of the normal time index, positioned as a fraction of the size of the list of transmissions reported by the directory server. Optionally, two sliders may be implemented, with a second slider for the priority time index. When a slider is moved, the corresponding time index is changed accordingly in response to this user input. If a single slider is implemented, then both the normal and priority time indices are adjusted to the newly indicated value. Adjacent to the slider, the current normal time index is shown (and if there are any audio sources given priority, priority time index is also shown). Together with this index information, the total number of transmissions reported by the directory server is also shown. For example, a report of "20:27" means that the normal time index is pointing to transmission 20, and there are seven additional known transmissions subsequent to the time of the current transmission. This information may be useful for manually bringing the time slider to a known point in the transmission sequence. The top set of buttons is used for selecting "banks", where buttons correspond to a set of audio sources (where an individual button corresponds to at least one source, and as many as all sources, or any number in between). By selecting banks, channels may be brought into the scope of the current selection criteria. This is similar to the behavior of bank buttons on conventional scanners. The lower set of buttons provide specific functions, including "hold" (temporarily reduce the selection criteria to the single audio source of the most recently received transmission, or release this restriction); "priority" (toggle membership of the audio source of the most recently received transmission in the "priority list" of audio sources responsive to the priority time index); "favorites" (toggle membership of the audio source of the most recently received transmission in a "favorites bank"); "lockout" (enter the audio source of the most recently received transmission into a "lockout list" of audio sources that should not be reproduced); "replay" (cause the most recently played transmission to be played again at the first available opportunity when the sound system is free, postponing or replacing any other transmission that ordinarily would have been played next); and "programming" (change mode of GUI operation from a normal reception mode to a special programming mode). When a transmission is complete, some of the text information is retained (such as the agency name) in a less prominent form (such as changing color to a subtle gray), so the user knows what audio source would be acted upon with some of these special function buttons. When the content selection rules are adjusted, in whatever way, it becomes possible to review prior transmissions referenced in the history list without requesting or acquiring new information about activity that was not within the previously selected scope. If new selection criteria extend beyond the bounds of what is known through this locally buffered or stored history list, then the directory server may be polled to request additional information, or an additional directory server may be queried, to update the history list with a more complete record of activity.

In programming mode, the user is presented with additional options for changing the selection criteria, such as stepping through a list of audio sources and individually adding or removing an audio source from the normal, priority, favorites or lockout lists, or entering a hold mode on the selected source. The "reply" button is given additional functionality in programming mode, and enters a hold mode on the selected channel while also resetting the time indices to the first reported transmission, initiating a playback of the full history of transmissions from the selected audio source. Further, in programming mode, the priority, favorites and lockout lists may be cleared, and all banks may be turned off. In addition, a number of alternate display modes may be initiated from the programming screen. These include a list of all available audio sources, color-coded to show what sources are within the current selection criteria, and what sources are given lockout or priority status; or a list of all transmissions reported by the directory server, with their associated index value, optionally color-coded to show what transmissions have been downloaded or reproduced, or what transmissions fall within the current selection criteria. Additional programming options may be provided, such as a tree structure of available audio sources (for example, providing a hierarchy by geographic location and/or agency type). Individual agencies may appear in multiple places within the tree. Top level items are like "Boston", "Sarasota", "Holland", "Police", "Fire", etc, and these filter down with more levels by geographic region or agency, as appropriate, with type of node changing at lower levels (e.g. "Sarasota->Fire" or "Boston->Newton->Police"). The user can select any point in this tree, and either "add" or "remove" the item, which toggles all agency listings in that sub-tree within the selection criteria rules. However, the data structures and GUI display type associations may be resource intensive, so these may be omitted for better performance. Alternatively, selection criteria may be made through a web browser, using a socket interface between the client software and the web server to command changes to the current selection criteria, or to save a current selection criteria configuration for later recall. Those skilled in the art will appreciate that there are other ways to access a database. For example, other methods could include a Google-like text search, or an expandable tree structure, or radio buttons. The user interface can be designed in radically different ways, to accomplish the same function—to allow access and selection of desired channel names.

The NART software is generally referred to as "Netscanner" software and may be started with a simple script file (a .sh file for Linux, or a .bat file for Windows). The file starts execution of each of these Python programs, including main, downloader, sound, texttag, cleartag). If all of the Python programs are implemented in a single .py file with startup parameters used to select the role of a particular instance, it may be convenient to include the startup process within the .py file as an additional role selectable via a special startup parameter, in place of an additional .sh or .bat file. However initiated, the startup process starts execution of each of these Python programs, including main, downloader, sound manager, and regular time event driver. Also, the startup file passes parameters that specify the intended form of execution, for example: the temporary directory for storing audio files; the command line to execute for playing an audio file; the expected timing delays for synchronizing the text tag presentation. Since these aspects can be controlled through startup parameters, the same software can be used on both Linux and Windows, without change. The assistant programs are started first, and each opens a single socket. Then the main program is started, and it connects to the socket of each assistant program, and also establishes a socket connection to the directory server. This is the mechanism for all inter-process communications. To populate the list of known available transmissions, the NART may request from the directory server a list of all directory packets transmitted recently, such as the last N packets, or packets transmitted within the last N hours. Optionally, such a request may include filtering, so that only directory packets referencing audio content from selected audio sources is included in this request. Through such a mechanism, the NART can immediately be used to review the history of audio content activity, even from before the time that a connection with the directory server was established.

The NADS and NAFS terminal 9 in FIG. 3 is implement on a single primary computer running the Linux operating system. This computer 9 is fulfilling two separate functions. The first function is a NAFS file server function that receives and distributes all the "Netscanner" audio files. It is running Secure Shell ("SSH"), which allows for remote automated uploads of files to the computer. It is running the Apache web server, and is responsive to HTTP requests. Both of these are standard Linux applications that are known to those skilled in the art. There is a shell script that monitors for uploaded files, which are compressed using the ZIP format, in an expected directory. It unZIPs them into OGG and TXT files, moves the OGG file to the correct position in the file system, inserts fileserver-specific information into the TXT data to generate a properly formatted and complete directory packet data section, and transmits the directory packet to the directory server.

All processed audio files in the computer 9 are stored under an "audio" web-visible directory, with subdirectories by time, and then further subdirectories by feed source ID. So, for example, a URL for a specific audio content file might appear as:

HYPERLINK "http://www.bluebrook.com/audio/116962/nafs904/nafs904-1169620029600.ogg"
http://www.bluebrook.com/audio/116962/nafs904/nafs904-1169620029600.ogg The digits "116962" are from the Unix timestamp, and identifies an interval of 10,000 seconds (2.78 hours). Using time as the top level of the folder structure allows performance of time-based operations more easily, such as removing old files, archiving files, etc. It also prevents confusion from re-use of a feed source ID code at different times. The "904" digits are the ID for the particular feed source. Finally, the filename of an audio file, to make each filename absolutely unique, includes the feed source ID and the time to the millisecond. In order to save space in the directory stream, this information could be compressed. For example, all information identifying this file is contained in the short section "904-1169620029600", and it would be possible to locally regenerate the rest of the path to create the URL.

Directory packets can be compressed in a number of ways. Since certain pertinence data will be constant for all transmissions on an individual audio channel, such as text-tag descriptors, broadcast frequencies or agency names, such information can be transmitted at periodic or irregular intervals over the directory channel in update messages associating a logical channel ID number with related pertinence data. Then, directory packet records relating information about a specific transmission may include a channel ID field, where the corresponding logical channel is given, implicitly importing the standard information known about that channel without including this information directly within the directory packet. Similarly, instead of update messages, such constant information can be obtained through a standard http download of a reference data file, a remote database query as channel number information not locally cached is needed, or through hard-coding or storage in a flash memory. In combination with a compressed representation of a filename, incorporating timing information, this allows for the reduction of a directory packet to a small number of bytes. To further increase the efficiency of a directory stream, the server providing the directory stream information may, when transmitting packets to connected NART units, filter the transmission and only send packets meeting some selection criteria (usually broader than the receive selection criteria used when determining what transmissions to play over the sound system). Such packet filtering selection criteria should exclude references to audio channels known to hold no interest to the NART user, while passing a range of audio channels at least sufficiently broad to meet the user's range of possible adjustments to the playback selection criteria. For example, such filtering may be done on geographic or agency bounds. In one illustrative embodiment, a given NART unit may subscribe to packet references for audio channels operative in selected geographic regions, while packets referencing audio channels not operative in the selected geographic region are not transmitted to this particular user. In this fashion, the quantity of directory packets sent to a particular user may be restricted, so that it fits within bandwidth limitations, without reducing the utility of the directory stream. Similarly, subscriptions in this fashion may be implemented by connecting to multiple directory servers, where the NART connects to a set of directory servers encompassing all audio channels that the user may reasonably expect to select with adjustments to the playback selection criteria.

When a NART unit manages a large number of channels and banks, it is beneficial to efficiently determine whether a given audio channel is "within scope" (a channel for which transmissions should be played) or "out of scope". Comparing lists of agency descriptive text tag strings can be time intensive, so the use of logical channel ID's can expedite this process. For example, a list of "within scope" channel ID's may be maintained, either as a linked list or an index-referenced array. Then, determining whether an arbitrary directory packet references a transmission within scope can be accomplished by seeing if the corresponding logical channel ID is marked as within scope. When the selection criteria change, in a way that moves channels into or out of scope, such a reference list would need to be updated. Similarly, the history list of known transmissions reported by the directory server may be annotated, either with logical channel ID's (especially if not supplied by the directory server), or with scope data indicating whether the transmission is on an audio channel in or out of scope. If audio channels may have multiple levels of priority, then the priority level of a given audio channel be indicated as part of the scope information.

The mechanism of the file server monitor is more complex. A single master program searches for ZIP files in an expected directory, spawns a secondary process to process the ZIP file (unzip, move audio file, assemble and transmit directory packet), and then deletes the ZIP file. The main process operates a timer, and if the spawned process does not complete processing in a timely manner, it terminates the sub-process and does not delete the ZIP file. This complex operation is done to keep the system from freezing if the connection to the directory server is lost. Whenever the directory server is available again, it works through all the accumulated ZIP files. To upload files to the file system, SSH is used as the standard secure Internet transmission protocol. In particular, a "remote copy" command that is part of SSH is used to transmit the file from the feed source to a temporary upload directory on the file system computer, and then use another standard SSH function to execute a remote command on the file server computer that moves the uploaded file from this temporary location to an incoming upload location. This is done in two steps to prevent the file system monitor from seeing the ZIP file, and trying to do something with it, until the file is fully uploaded.

The second function of the computer 9 in FIG. 3 is that of the NADS. With this function, the computer 9 receives fully formed directory packets from the file server monitor program, and passes these packets to each of a list of clients, including the Nokia terminal 1. The directory server is responsive to clients establishing new connections, the file system monitor reporting new files available, and a time program. The time program simply injects a time report every 'N' seconds into the directory server, and that time is passed through the system and sent out to clients. This maintains the directory server connection during quiet intervals. The same "Netscanner" script performs all these functions—directory server, file system monitor (all three programs—main monitor, sub-process for working on a single uploaded file, and copy program to bring new files from secondary username to primary username), time mark generator, and even the feed source Linux version. When executed, the file's function is selected by a command line parameter. It isn't important that these functions are all wrapped into a single script file, it could have easily been broken into separate files for each function. Some portions of these programs are written in PHP (primarily socket communications), most of it is Linux shell scripting.

Access to audio content may be limited or restricted in various ways, either system-wide, or in accordance with the specific audio source. For example, certain sources may restrict access to all or some originating content by suppressing the distribution of directory packets announcing the content to users without sufficient rights to access the content, or by creating server download restrictions (such as passwords or cookies) to prevent download of this content by unauthorized users. Similarly, some audio sources may introduce delays in availability of audio, by introducing a time delay between the capture and publication of the audio content. Such a delay may be introduced at the NAFS, at a server where NAFS content is uploaded (before announcement of the data to a directory server), or at the directory server. Access restrictions and time delays may be adjusted dynamically, such as by the party originating the audio content, in response to current conditions. For example, in certain emergency response situations, it may be desirable to limit access of certain audio content to authorized users, or to impose a delay so that the material is not accessible for a certain period of time. Similarly, in a social networking application, users may restrict access to certain audio content to selected friends, while other material is made generally available.

While a typical application distributes audio transmissions originally broadcast over radio frequencies, other input sources are also envisioned within the scope of the present invention. For example, in a social networking application, members would be assigned personal audio channels where they can provide audio input, via network or telephone. These transmissions, as input into the system, would be made available through distribution of a directory packet announcing the audio content availability along with appropriate pertinence data. These transmissions could be received in the same manner as any other type of audio content distributed through this type of system. For example, if a user's content selection criteria includes a set of audio channels corresponding to a set of friends, then transmissions from these friends would be reproduced onto a common audio output line, without collisions between simultaneously available content. Further, the user can replay transmissions, or review transmissions submitted and made available over prior hours or days. Selected content may be available subject to access restrictions such as allowing distribution only to users on an authorized or friends list. A compact digest of audio content published by friends over a prior interval, such as the last 24 hours, or all content published since the user's last digest review, without collisions or gaps, dynamically generated in response to the user's social networking friends list, represents a significant advance in social networking communications technology. This type of application is an example of what the present invention can enable.

In some circumstances, a significant number of users may be interested in audio transmissions on a limited number of channels originating from a specific geographic location. Typical examples include a sports event (such as a NASCAR race) or a widely publicized emergency (such as a major fire, hostage situation, car chase, or weather related event). Since a large number of users may be switching between a limited set of channels, it is advantageous to apply alternative audio delivery mechanisms within the scope of the present invention. For example, the content selector may be located at a web server that generates a customized audio content stream to the NART. In this case, the NART does not need a connection to a directory server, although the NART may have an uplink channel or other remote control capability to specify changes to the content selector for this customized stream. As in the standard embodiment, the content selector can identify and play the next appropriate audio selection from a set of available files, but where this selection is implemented at a server. Alternatively, the content selector can act as a switch between currently active audio streams from the audio input sources, connecting the customized stream to an appropriate input source based on the selection criteria, with periods of quiet when no source is indicated. These concepts may be merged, so that the stream sometimes plays a selected source through direct piping when a current transmission is indicated by the selection criteria, and when a previously recorded transmission is selected it is played through reference to a recorded file. In another variation, the NART may receive a group of audio streams with current audio from various sources, relocating the content selector back to the NART. Once again, the content selector may switch among these streams, and optionally buffer or download content for delayed playback when indicated by the selection criteria.

In the preferred embodiment, the directory server references audio files available at a file server. However, in another variation, the directory server may reference content on one or more audio streams. For example, a NART unit may obtain a set of streaming audio connections to obtain content from multiple audio sources, and use a content selector to select content for audio reproduction from among these streams (either as received by selecting among streams, or through the intermediate stage of buffering some content for later playback). In this context, a directory server may reference current content on these streams, or provide pertinence data correlated to specific times on specific streams. To reduce the number of streams that are required to monitor a given number of audio sources, the stream origin may use a smaller number of streams and use the directory server to identify the content on each stream at a given time, instead of relying on a particular stream always corresponding to a particular input source (as would be expected with a traditional stream connection).

To reduce latency related to storage time, it may be desirable to combine NAFS and file server functionality so that audio is recorded to a file that is immediately available for download, even before the file has been completely written. Alternatively, a stream may be created from the NAFS to a file server, where audio is stored in this format where read/write actions may be concurrent on the same file. In such cases, the directory server or content selector may be notified of the existence of a file when the file starts to be written, instead of at the end of transmission. In addition, to reduce latency related to download time when audio is received as individual files, the NART may use an architecture where audio bits are effectively piped from the TCP/IP connection to the sound system without waiting for the file to be completely downloaded. When several audio channels are obtained through radio reception at a single geographic location, there are advantages to combining the NAFS with the file server, and possibly a directory server, at a co-located facility. For example, data transfers between functional elements may be faster, especially if some related computers operate on a local area network.

When audio from an event is associated with video from the same event, possibly available through another path (such as a TV feed, either by air, digital cable, satellite or internet), it may be desirable to synchronize audio content produced by the content selector to the video feed, or to ensure that audio content is not reproduced ahead of the corresponding video. When the video source includes time reference information, the content selector may use this information to determine the appropriate time for reproducing certain content, or the content selector may use this information to limit the availability of content available for selection at that moment in time. A similar timing restriction may be applied if it is desirable to prevent the playback of certain audio content before a specific clock time (such as for embargo reasons) or before a specific elapsed delay since content origination (such as delays that may be requested by content providers, or delays to allow for the administrative cancelation of inappropriate content).

The NART display may include content, such as text, images, photographs, icons or other graphics, displayed in response to commands sent on the directory stream, or in response to pertinence data related to a selected transmission. For example, in response to pertinence data indicating the audio source of a selected transmission, corresponding text, images or graphics representing some characteristic of the audio source may be displayed (e.g. an image of the Seattle skyline for transmissions from Seattle; a police icon for transmissions from a police department; an agency logo for transmissions from a specific agency; a user icon or photograph for transmissions from a specific registered individual; an event graphic for transmissions from a known event; etc). Similarly, displayed content may include advertising, news feeds, weather conditions from the region of the audio source, telemetry data from the audio source, or similar information. Displayed information may be real-time, or more usefully, valid coincident with the original time of transmission (e.g. the score of a game, or the positions in a race, at the time that a transmission related to the sports event was originally created).

Through pertinence data or the creation of special banks, the NART may be informed that certain transmissions relate to a specific event (such as a sports event), and graphic or other information relating to the event may be displayed. Special banks for event-related transmissions may be created administratively, or by audio sources identifying themselves as related to the event, or by users tagging certain audio sources as having this property, or by similar actions on specific transmissions (instead of channels generally). Membership of a channel in such a bank may be universal (applying at all times), or it may be narrowed by additional pertinence data characteristics (such as associating transmissions from a specific channel with the special bank only when the transmissions originate within a certain period of time).

As an illustration of an application of a special bank, audio sources from agencies related to a specific event (such as public service agencies operating at a baseball game) may be grouped into a special bank. Alternatively, in a social networking application, users attending a baseball game may register themselves as attending the event, and content originating on their audio channels during the event would be tagged through bank membership or pertinence data as related to the event. In this example, a NART user can select the special bank to monitor public commentary from various individuals attending this event.

Another advantage of the present invention is interoperability across a variety of audio delivery formats. Audio is presently transmitted in a wide variety of mutually incompatible means and formats. There are systems with dedicated radio frequencies, a variety of trunking radio systems, VOIP and other Internet delivery formats, and direct point-to-point telephony. There are systems where audio is presented in a plain audio or digital format, sometimes with encryption or compression methods. As a result of the myriad transmission modes, when trying to receive from a variety of unfamiliar audio sources, the user may be confronted with a bewildering array of receiver types, protocols, decompression rules, or encryption keys. In contrast, the present system levels this field, providing a single delivery format for audio transmissions received from any source that feeds into the system. In effect, this provides an abstraction layer isolating the receiver from the custom format of the transmission source. This can provide significant benefits for public safety, emergency response, and Homeland Security users where prompt delivery of audio from multiple sources is necessary, without foreknowledge of what particular sources may be required, or what particular targets may need to receive this information. The combination of this audio delivery format interoperability with the inherent ability of this system to provide nonrealtime and historical review of prior transmissions provides a novel and very powerful tool in emergency response situations.

The present invention provides novel benefits for emergency services and Homeland Security, especially with respect to interoperability and the capacity to monitor multiple agencies using different radio systems. This is an efficient method for allowing all agencies to monitor the radio communications of all other agencies in a region. With such a network, remote monitoring of the region by, for example, federal agencies is equally possible. Every radio transmission is reduced to a single common denominator—conventional audio files—regardless of their origin as conventional, digital or encrypted transmissions. All bands and frequencies can be covered including public safety, aircraft and marine. Important special situations involving short-range communications (hostage situations, fires, plane crashes, disasters) can be inserted into the system using portable NAFS equipment. This will allow such situations to me monitored by distant state and federal agencies and command centers. Agencies that are impossible to receive for reasons of distance, interference or incompatible equipment can thus be monitored with perfect reception, even deep within shielded buildings, or in vehicles, or from geographically remote locations. Non-radio audio sources can also be brought into the system, by capturing and feeding audio channels obtained from telephone, direct line, or internet VoIP sources. Monitoring is possible on NART units, including PCs or mobile PCs, at any location that has internet access. Transmissions are logged, stored, and available for selective replay. Transmissions may be played in sequence, or immediately, as desired. Displays can provide a visual summary of active communications and communications history. All communications are archived. The depth of the archive may be whatever is desired in the system specifications. This is an unprecedented advance in government communications interoperability.

The directory stream provides a nearly real-time image of activity on a large number of logical audio channels carrying intermittent audio content. This directory stream is received at a NART unit, and in a typical embodiment, a database of available transmissions is generated by accumulating information content from the directory stream, with transmissions indexed by channel identifier and optionally additional pertinence data, such as the actual or relative time of transmission. A content selector system applies rules to this database to determine what transmissions to play, and in what order. The content selector may operate in a multidimensional space, moving through both time and channel identifiers, and optionally other dimensions representing other types of pertinence data. The user may, for instance, move a time slider control to switch the playback time index to an earlier point, with playback resuming from that prior time and moving forward. This may be done to replay a sequence that was heard, listen to past events on a channel indexed but not previously monitored, or otherwise review recent activity on the system. Similarly, the user may select or deselect channels, or banks of channels, to change which transmissions are being heard. The combination of these elements, where a content selector allows the user to move the playback audio stream through a multidimensional space including time and channel identifier, creates a type of virtual reality emulation in which the user can explore a rich spacetime environment filled with intermittent audio content describing places and events. This provides the user with new opportunities to understand the reality described in the audio content referenced through the directory stream. For example, if a user hears a fire truck in his neighborhood, with a conventional scanner, he could start listening to the audio output from the scanner—but he would have missed the original dispatch that described the nature of the emergency. In contrast, with a scanner monitoring a directory stream, the user can use the virtual reality environment, with an appropriate configuration of the content selector, to move "back in time" and listen selectively to recent activity on the fire dispatch channel. This will reveal the nature of the emergency, and present the sequence of events that has transpired to the present time relating to this emergency. Since the transmissions are intermittent, the total transmission time on a single channel will generally be less than the elapsed time, so playback will be more rapid than "1:1" time, and the time index will catch up to the present time. In effect, the reviewed transmissions are presented in a condensed audio digest, with empty time between transmissions removed. (In a variation, this empty time may be preserved intentionally, to retain the cadence and relative timings of the original event thread being monitored, but in general it is more useful to remove empty time between transmissions.) Then, as the time index catches up to the present time, the NART will smoothly transition to monitoring of this specific agency to maintain awareness of further events as they unfold. At any time, the user may alter the content selector configuration to broaden his selection filter to include other agencies that become involved (such as the local police or EMS services), and move "back in time" to get an update on how these agencies were dispatched to or involved in the emergency being monitored.

Since the directory stream and file server architecture operates over a data network, geography is no limitation to the effectiveness of this monitoring system. For example, during a hurricane, if the affected region is served by NAFS terminals covering related agencies, then a NART user in a remote location can keep fully aware of emergency services management of the emergency. The ability to adjust the content selector to move through this virtual spacetime allows a user to carefully observe one aspect of the emergency, then switch to another aspect, without risk of losing coherence or context in a threads not currently monitored at the audio playback level. Such unmonitored threads continue to be collected and indexed through the directory server, and will be available for playback at a future time, with a complete and comprehensive archive.

In contrast, a conventional scanner would impose numerous limitations on such an application. These limitations include an inability to receive signals originating over the horizon; an inability to separately play (one at a time) concurrent threads of conversations that actually happen simultaneously on different channels; an inability to look back and observe past activity on a channel not previously monitored at the audio speaker; an inability to replay the early stages of a thread not recognized as holding particular interest until the thread was more fully developed. These limitations are overcome through the application of the present invention.

It is anticipated that a user may want to monitor multiple threads, including some as close to real time as possible, and others in the context of a past lookback review. For example, in the hurricane example, a user may want to keep aware of current activity on selected emergency channels, while reviewing how events on a specific thread unfolded to the present condition. In such cases, the content selector may be configured to maintain separate time indexes for different sets of channels, and activity on certain channels may be given a higher relative priority than activity on other channels.

In some respects, such an embodiment resembles a hologram (although, unlike a true hologram, this system allows for changes in perspective in time as well as space). A database of available transmissions obtained from a directory stream, in combination with the referenced audio files (at the file server or buffered locally at the NART), provides a digital record of activity across a group of audio channels over a period of time. This record cannot directly be rendered to the senses, but through the application of the content selector, the user may view this holographic record from numerous perspectives, each rendering a unique sensory experience through the composite audio feed output line. By changing perspective, the user moves through this multidimensional virtual reality, and can view the information from numerous angles, thereby obtaining a clearer picture of the whole circumstances, in more detail and depth than would have been possible from any static perspective on the events unfolding during the recorded period.

In addition, since information may continue to be collected from the directory stream while this database is being utilized, the analogy may be closer to a dynamic hologram that continues to gather information in real time about the changing circumstances. This is envisioned as a particularly useful embodiment, but such a database and content selector combination may also be employed for static information (such as a historical recording of a past event) where the directory stream is not at or near real time, but an image of static database content. Conversely, in another variation, without passing directory stream content through the intermediate layer of a database, the content selector may work directly on the content of the directory stream to differentiate (in real time, or near real time, only) and select transmissions to play or not play.

This multidimensional perspective, with motion possible through adjustment of content selection based on both time and audio channel, also has applications in social networking environments, or in public commentary or eyewitness accounts relating to a shared event. In these contexts, the user may repeat the experience of a certain period of time from different perspectives, including different sets of audio channels for each iteration, to see how a period of time unfolded from the perspective of the selected individuals, or sets of individuals. Once again, the information exists in a kind of holographic form, as a constellation of intermittent audio recordings held together through an index with knowledge of the time and source of these elements, with a content selector to give the user control over the perspective with which this holographic database is transformed into a sensory aural experience.

During operation, the content selector may be adjusted or reconfigured to change the selection criteria, including the selected audio sources, the time of original transmission, or other criteria relating to pertinence data. The content selector may be adjusted to cause reproduction of audio content as it becomes available, or audio content that was previously recorded as available in a database, irrespective of whether it was or was not previously reproduced. A given time period may be reviewed multiple times with different selection criteria, resulting in different selections of audio transmissions and different playback sequences.

In some applications, it may be useful to create a playlist of a group of related or selected audio files. This may be particularly useful when created or managed using an interface connected as herein described, receiving a list of available transmissions from a directory server, supporting changes to selection criteria, and allowing user-commanded motion through the time domain of indexed transmissions. In this context, the user may select individual transmissions, or logically defined blocks of transmissions, to add to a playlist. When audio files are referenced by or available from standard internet URL's, such a playlist may be recorded in a standard format, such as an M3U playlist file. Alternatively, playlists may be generated by adding pertinence data to the information associated with particular transmissions, assigning selected transmissions to certain categories or playlist threads. Created playlists, or pertinence data defining changes to transmission classification or threads, may be uploaded to a directory server, file manager, or http server. The directory server may be notified of such downloadable playlists, and references to such playlists may be incorporated into directory stream information, either associated to a time index (such as the time index of the referenced transmissions, or the present time), or simply made available as part of a time-independent library of noteworthy historical transmission sequences. Similarly, the directory server may add pertinence data to its local archive regarding selected transmissions. The file server may be notified of downloadable playlists, so that incorporated audio files are marked for preservation and not deleted if files are purged from the storage medium. To illustrate applications of such playlists, a user may note transmissions related to a particular event, and effectively tag these transmissions so that they are classified together, placed into a thread together, or grouped into a defined sequence of related transmissions. This takes advantage of a user's ability to monitor, interpret and discriminate substantive qualities of transmissions in greater detail than is possible with automatically generated pertinence data.

Through these elements, such playlist generation or pertinence data annotation effectively provides additional pertinence information regarding these transmissions, or creates groupings of transmissions that may be managed or played as units instead of merely constituent files. In particular, one benefit of this approach is that unrelated transmissions, with otherwise similar pertinence data, may be excluded from certain future reproductions of audio sequences involving these transmissions. In addition, the newly created information is useful for locating and identifying historically noteworthy transmission sequences from the enormous archive of audio files that may become indexed and available through application of the present invention.

When a NART obtains content over a network and local means, such as an RF receiver, these two classes of content may be merged logically and managed in a similar fashion. Audio from a locally captured source may be recorded and stored in a local audio file, in a manner similar to content downloaded over a network and locally buffered pending playback. From this point, audio from local and network sources can be viewed equivalently when determining reproduction order and timing. In effect, knowledge of locally captured audio content is fed into the audio content selection system, which is empowered to operate on both classes of audio content in a similar fashion. The NART may be equipped with a database of audio channels, including channels accessible over the network and also channels accessible from local sources, and the user interface for the content selection system may differentiate between these classes of audio source, or even present the two classes in a seamless fashion without indication of where the audio would be obtained if selected. In the case of RF reception, with a database of known active RF audio sources, the system may offer local RF reception as a selectable option for certain channels, and if selected, command the RF module to receive according to RF parameters associated with the channel in the database. However, if RF reception is unselected for the channel, without further change, the content selector may then obtain this audio channel via the network. Determination of which source to use can be done automatically, such as through distance computation between a GPS position and known RF broadcasting positions, or through autocorrelation between RF transmission detections on a given frequency and directory channel reports of activity on a RF channel known to operate on that frequency. If it is determined that a selected audio channel is available from local RF capture, then that acquisition route may be selected, for the benefit of faster response to transmissions and reduced bandwidth. Conversely, if it is determined that a selected channel is not available through local RF capture, then the NART may automatically engage network capture of this content.

Figure 4:
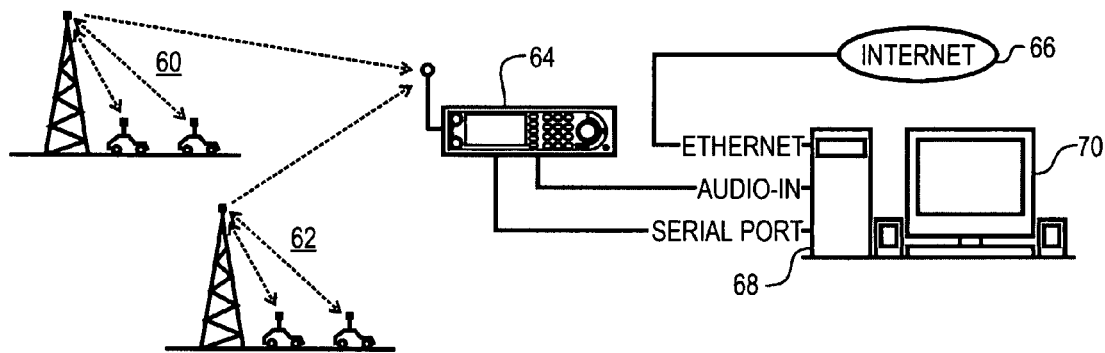
FIG. 4 is a PC computer based network audio feed source system according to an illustrative embodiment of the present invention.

FIGS. 4 through 7 illustrate several illustrative embodiments of network audio feed source (NAFS) terminals. Reference is directed to FIG. 4, which is a PC computer based network audio feed source system according to an illustrative embodiment of the present invention. In this illustrative embodiment, a commercially available scanning radio receiver 64 is programmed to monitor plural land mobile radio systems 60, 62. The scanning radio receiver 64 is coupled to a conventional personal computer 68 through and audio input to the computer 68 and a serial port on the computer 68. For example, a sound card and USB port on the computer could be used. Commercial scanning radios are known to have audio output and communication ports. The communication ports are used to control operation of the scanning radio and to transfer source data information about presently received audio content, such as frequency of operation, squelch or talk-group identities, and textural descriptions. The computer includes the usual interface components 70, including a video monitor, keyboard, speakers and so forth. The computer 68 is coupled to the Internet 66 via an Ethernet port in this embodiment. NAFS software runs on the computer to enable the feeds source and directory server functions of the present invention.

Figure 5:
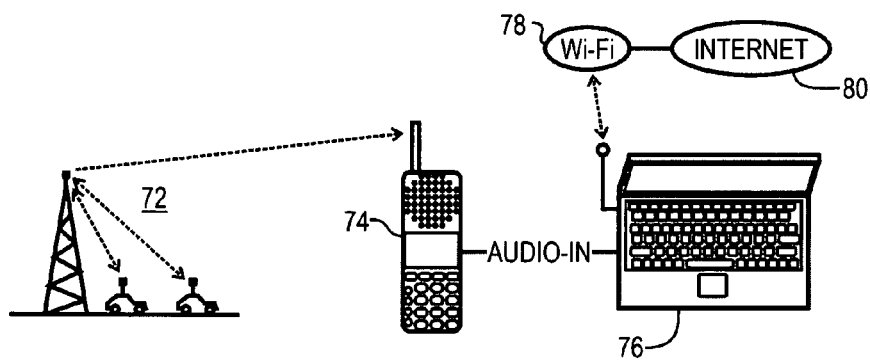
FIG. 5 is a laptop computer based network audio feed source system according to an illustrative embodiment of the present invention.

Reference is directed to FIG. 5, which is a laptop computer based network audio feed source system according to an illustrative embodiment of the present invention. This embodiment lends itself to convenient portable operation. A portable scanning radio receiver 74 is programmed to monitor a local land mobile radio system 72, such as the local police, fire, and EMS radio system. The audio output of the scanner 74 is coupled to an audio input on a laptop personal computer 76, and provides the audio content source for this NAFS. The laptop computer is Wi-Fi enabled, and thusly is enabled to communicate through the Internet 80 via any complaint Wi-Fi hot spot 78, as are known to those skilled in the art. The laptop computer executes software that enables the functions of the present invention NAFS and NADS, if so equipped. This embodiment has the advantages of portability, battery power, and wireless connectivity.

Figure 6:
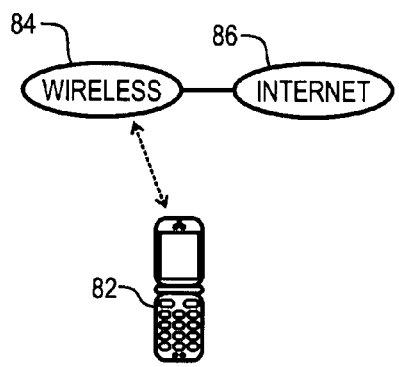
FIG. 6 is a wireless telephone based network audio feed source system according to an illustrative embodiment of the present invention.

Reference is directed to FIG. 6, which is a wireless telephone based network audio feed source system according to an illustrative embodiment of the present invention. An important advantage of the teachings of the present invention is the flexibility of the architecture, enabling a very wide variety of network terminal devices. FIG. 6 illustrates a remarkably compact and portable implementation. A wireless telephone includes a NAFS software application that enables the user to source audio content through the microphone of the wireless telephone 82, or through any audio source coupled to the microphone input on the wireless telephone 82, and to feed this audio content into the Internet 86. The Internet connection is accomplished through the telephone wireless network 84 Internet connectivity, as is understood by those skilled in the art.

Figure 7:
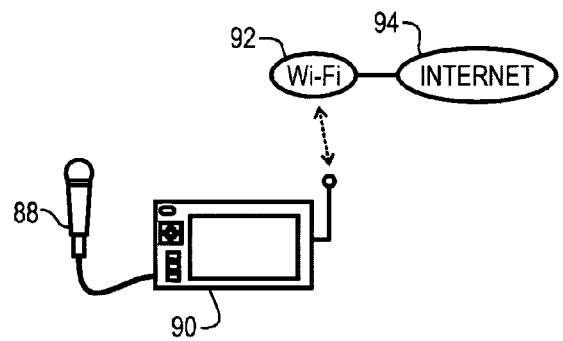
FIG. 7 is a PDA based network audio feed source system according to an illustrative embodiment of the present invention.

Reference is directed to FIG. 7, which is a PDA based network audio feed source system according to an illustrative embodiment of the present invention. Personal digital assistants ("PDA") 90 are terminal devices that frequently include wireless Internet connectivity via the IEEE §802.11(g) wireless standard. By incorporating application software to perform the NAFS and NADS functions, the PDA is converted into a network terminal according to the teachings of the present invention. In this illustrative embodiment, a microphone 88 is coupled to the PDA 90, and acts as the audio source for audio content. The PDA 90 communicates through a Wi-Fi hot spot 92 to enable Internet access 94.

Figure 8:
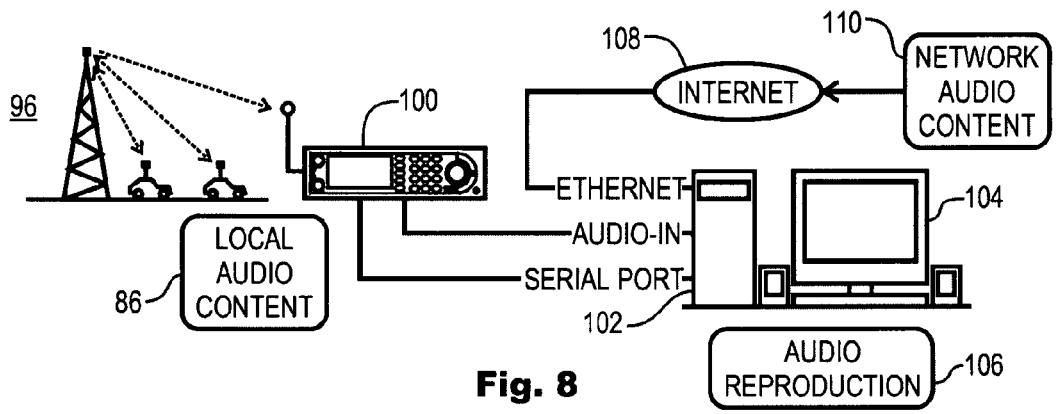
FIG. 8 is a PC computer based network audio receive terminal system according to an illustrative embodiment of the present invention.

FIGS. 8 through 11 are drawings of various illustrative embodiments of network audio receive terminals. NART terminals commonly scan local audio sources together with the audio content that is scanned through the network. As noted hereinbefore, these NART terminals commonly function as NAFS with respect to the locally source audio content, enabling a multi-node network environment with bi-directional transfer of audio content and pertinence data. Reference is directed to FIG. 8, which is a PC computer based network audio receive terminal system according to an illustrative embodiment of the present invention. Network audio content 110 is coupled through the Internet 108 via an Ethernet port in the IBM compatible personal computer 102. This connection enables the computer 102 to receive and scan plural sources of audio content through the Internet 108. The audio reproduction function 106 is accomplished through the computer user interface, which includes loud speakers. Note that the computer monitor and keyboard portions of the user interface 104 are used to enter selection criteria and scan criteria by the user. The NART software running on the computer 102 is further enabled to scan the audio and pertinence data content 86 from a locally connected scanning radio receiver 100. The interface is accomplished using an audio port and serial port in the computer 102 and the scanner 100. The scanner 100 monitors a local land mobile radio system 96 for audio content.

Figure 9:
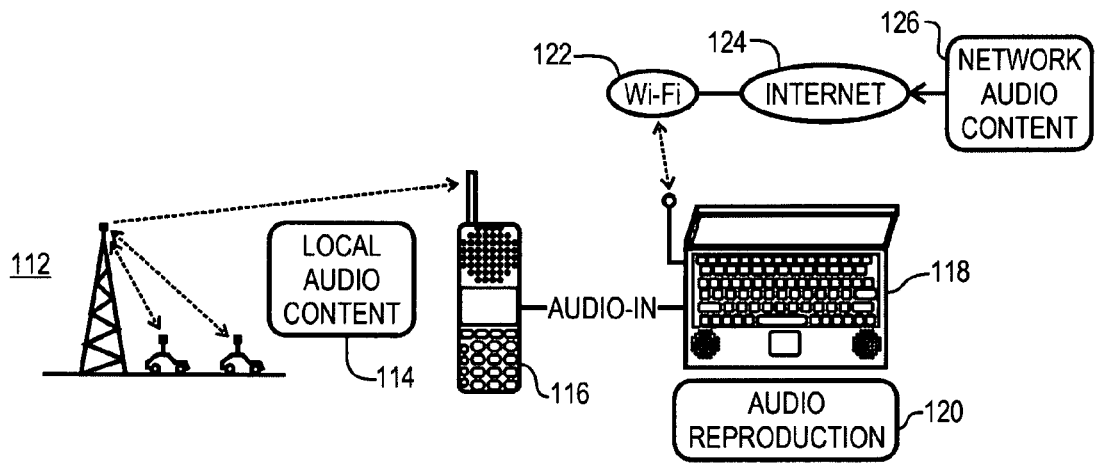
FIG. 9 is a laptop computer based network audio receive terminal system according to an illustrative embodiment of the present invention.

Reference is directed to FIG. 9, which is a laptop computer based network audio receive terminal system according to an illustrative embodiment of the present invention. Network audio content 126 is sourced from the Internet 124, which is coupled to a laptop personal computer 118 through a Wi-Fi hot spot 122, as has been discussed hereinbefore. NART software runs on the laptop 118 to enable the scanning and selection process in the NART. Audio reproduction 120 is accomplished using the loudspeakers in the laptop 118, or through the use of headphones. This arrangement enables a full function network audio scanner NART. Optionally, a locally connected portable scanning radio receiver 116 can be coupled to the laptop computer 118 using an audio level interface. Thusly, local audio content 114 is provided as the scanner 116 monitors a local land mobile radio system 112.

Figure 10:
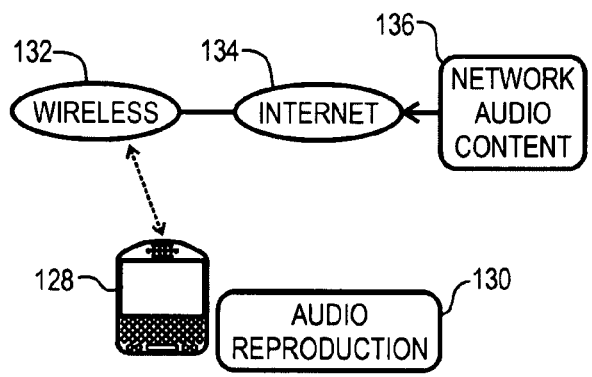
FIG. 10 is a PDA based network audio receive terminal system according to an illustrative embodiment of the present invention.

Reference is directed to FIG. 10, is a PDA based network audio receive terminal system according to an illustrative embodiment of the present invention. This embodiment employs a personal digital assistant 128 that is wireless enabled as the host for the NART application software. Network audio content 136 is sourced through the Internet 134, and may be delivered through a wireless telephone network 132, that is Internet enabled, as are known to those skilled in the art. Audio reproduction 130 occurs using and audio user interface in the PDA 128.

Figure 11:
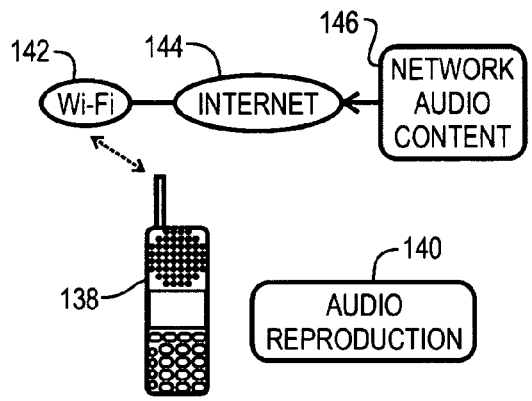
FIG. 11 is a portable scanner based network audio receive terminal system according to an illustrative embodiment of the present invention.

Reference is directed to FIG. 11, which is a portable scanner based network audio receive terminal system according to an illustrative embodiment of the present invention. In this embodiment, a portable scanning radio receiver 138 is adapted to include a wireless Internet terminal interface, such as an IEEE §802.11(g) transceiver, and includes a microprocessor that acts as the host for the NART application software. Network audio content 146 is sourced through the Internet 144 through a nearby Wi-Fi hot spot 142. The hot spot 142 communicates with the scanner 138. Audio reproduction 140 is accomplished using the audio user interface in the PDA 138. Of course, the scanner 138 is also able to scan local radio broadcasts and thusly provide local audio content in addition to the network audio content 146.

Figure 12:
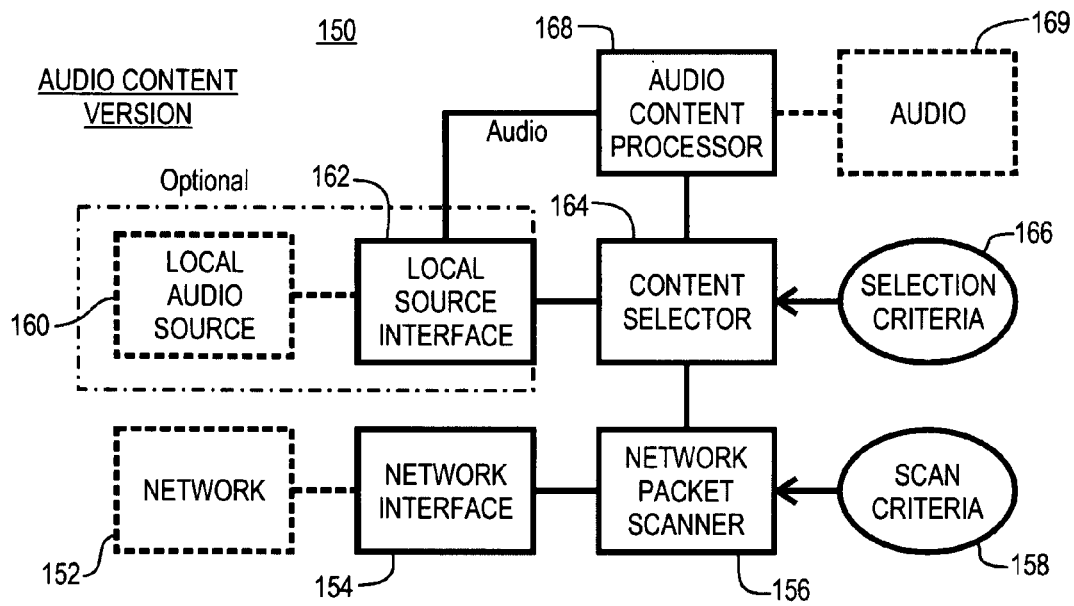
FIG. 12 is a functional block diagram of a network audio receive terminal according to an illustrative embodiment of the present invention.

Reference is directed to FIG. 12, which is a functional block diagram of a network audio receive terminal according to an illustrative embodiment of the present invention. The NART 150 in FIG. 12 is adapted to receive audio content through a network 152, such as the Internet, and optionally may receive audio content from a local audio source 160. A network interface 154 is adapted to interface to the network 154. In the illustrative embodiment, an Ethernet interface is employed. However, those skilled in the art will appreciate that any suitable network interface may be employed so long as it enables communication of content with the network. Thusly, audio content may be selectively communicated from the network 152 into the network interface 154. A network packet scanner 156 is coupled to the network interface 154. The network packet scanner serves to scan various units of audio content in accordance with predetermined scan criteria 158. A wide range of scan criteria can be employed. For example, a single source of audio content can be sequentially scanned over time. This is appropriate in the case of an intermittent audio content source. Or, plural audio sources can be simultaneously scanned. Priority criteria can be employed such that certain audio sources are scanned more frequently so as to increase the likelihood that most desirable content will be detected quickly. The network packet scanner 156 is used to identify audio content that meets the scan criteria 158. Once identified, that content, or an indicia of audio content, is forwarded to the content selector 164.

Amongst all of the scanned audio content presented to the content selector 164, a portion thereof is selected based on predetermined selection criteria 166. Selection criteria encompasses a range of metrics that place certain units of audio content in a more preferred class of content. The content presented includes both of the audio content and the corresponding pertinence data. The selection process can be based on either, or both of these kinds of content. For example, a user may have established a selection criteria that always selected content from a particular source, based on the pertinence data, such as the local police dispatch channel. Another selection criteria is that the audio content is associated with pertinence data that establishes a certain priority threshold. In this situation higher priority audio content is selected. The selection criteria may also be relative in nature. For example, routine traffic from a given source may have selection criteria such that it is always selected. However, when higher priority content is scanned from time to time, the content selector 164 may preempt the routine traffic. The audio content processor 168 is linked to the content selector 164 and operates cooperatively therewith. For example, the audio content processor may buffer the routine traffic during a priority preemption, and then reproduce the routine traffic once the priority traffic terminated.

In addition to selecting network audio content received through the network packet scanner 156, the content selector 164 can also select content received through a local source interface 162. A local audio source 160, such as a scanning radio receiver, is coupled through the local source interface 162. The local source interface 162 couples both audio content and pertinence data from the local audio source 160. Thus, the content selector is able to apply selection criteria 166 to the local content based on either or both of the audio content received or the source pertinence data received. Note that while only a single local source is illustrated in FIG. 12, the present invention contemplates that plural local audio sources may be coupled to the content selector 164. Also, note that the audio content from the local source interface 162 may be coupled directly to the audio content processor 168. This arrangement is useful in the case where the local audio content is directly reproduced for local listening without selection processing, however, it may be interrupted with higher priority network audio content through action of the content selector 167. The audio content processor 168 receives audio content from the content selector 164 or from the local source interface 162.

In a direct mode of operation, the audio content processor receives audio content and immediately acoustically reproduces the content to an audio output device 169, such as a loudspeaker or headphones. In the case of audio content received directly from the local audio source interface 162, the entire connection is in the analog domain. In the case of audio content received through the network, where digitally encoded audio content is communicated, the audio content processor 168 performs a packet disassembly and digital to analog conversion process, before amplifying and acoustic reproduction. However, the audio content processor performs other operations on audio content in addition to direct reproduction. Audio content buffering is performed in a variety of circumstances. Since the audio content processor may receive audio content from plural sources, and since the volume of audio content may exceed the available time capability of reproduction, one or more source of audio content are buffered and reproduced as time and conditions warrant. Also, in the case of intermittent audio content, the reproduction process can compress quiet intervals between content and reproduce in a compressed, non-real time fashion. Also, where the audio content processor 168 is reproducing a first audio source, and where a higher priority source provides intervening content, the audio content processor 168 will suspend and buffer the lower priority content so as to process the higher priority content more timely. Another aspect of the audio content processor 168 function is that audio content may be processed in some other fashion than direct reproduction. Recording functions are implemented as well as forwarding functions. In one embodiment, the audio content processor 168 couples the steam of audio processed though a communications channel to another device for ultimate reproduction. For example, the stream may be fed into a network for reproduction by a distant network terminal.

Figure 13:
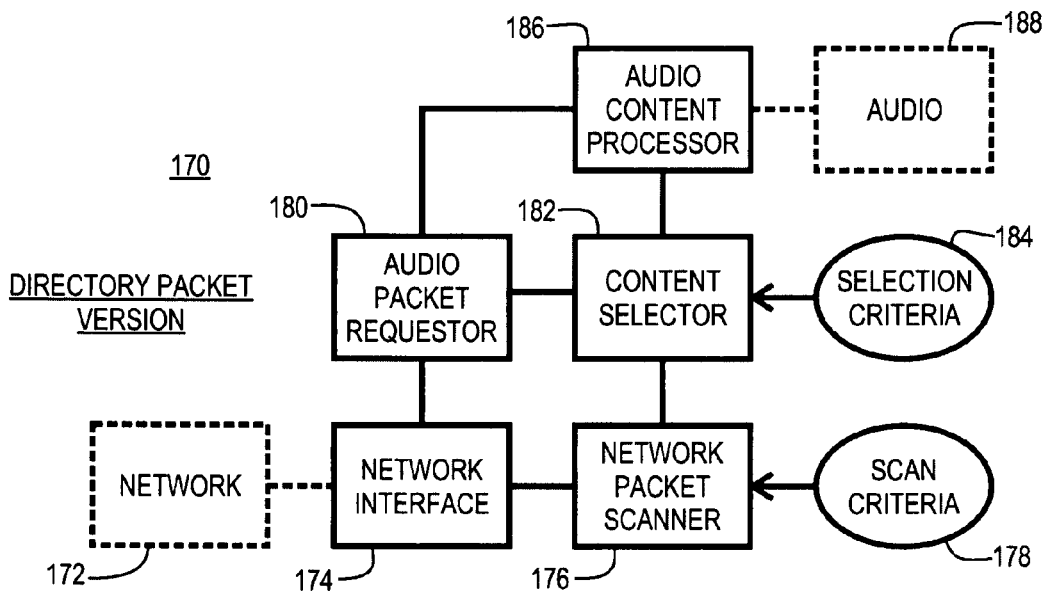
FIG. 13 is a functional block diagram of a network audio receive terminal according to an illustrative embodiment of the present invention.

Reference is directed to FIG. 13, which is a functional block diagram of a network audio receive terminal according to an illustrative embodiment of the present invention. The network audio receive terminal ("NART") 170 in FIG. 13 shares much of the structure and functionality of that in FIG. 12, however, the embodiment in FIG. 13 adds structure and functionality to support receipt of directory packet streams and corresponding requests for content. Accordingly, the descriptions related to the network 172, network interface 174, network packet scanner 176, scan criteria 178, content selector 182, selection criteria 184, audio content processor 186, and audio output 188 generally correspond to those of FIG. 12. In the directory steam mode of operation, the NART 170 on FIG. 13 scans pertinence data in network directory streams received by the network packet scanner 176. When the scan criteria 178 indicates the presence of content, the corresponding network packets are forwarded to the content selector 182. If a particular unit of content meets predetermined selection criteria 184, then the content selector 182 passes at least a portion of the corresponding packet to the audio packet requestor 180. The audio packet requestor parses out the network address of the desired audio content, and then forwards a request for that content into the network 172 via the network interface 174. When the requested audio packets are returned through the network, the audio packet requestor routes these packets to the audio content processor for subsequent processing, acoustic reproduction, and so forth. The NART 170 also functions to process network content that includes audio content. And, local audio sources can be coupled to the content selector 182 and audio content processes 186, as described hereinbefore.

In both of the foregoing NART embodiments, the coordinated operation between the content selector 184, 182 and the audio content processor 168, 186 enable the provision of several advanced features unknown in the prior art. An example of this is the time-ordered playback of audio content from a buffer in the audio content processor. In this mode, a first selected audio content has completed reproduction into a composite audio feed, and a second selected audio content begins playback onto the composite audio feed, where said second selected audio communication is the earliest received among pending selected audio communications. This enables selective time-ordered reproduction based on selection criteria rather the expected first-in-time, first to be reproduced scenario. Another example is the implementation for the hold function. In this mode, a first selected audio content has finished reproduction onto a composite audio feed, reserving the composite audio feed for subsequent audio content from the same audio source for a limited hold time. Another example is the implementation of content selection criteria based on global positioning systems ("GPS") coordinates. In this mode, the NART is equipped with a GPS receiver that outputs the current GPS coordinates to the content selector. A database correlating audio sources to geographic regions is included. The selection criteria gives an elevated priority to audio content from audio sources of interest at the measured global positioning system location. Another example is the use of other geographic location references, such as a user entered postal ZIP code. In this mode, the user enters a ZIP code corresponding the current NART location. The selection criteria gives an elevated priority to certain audio sources based on a database correlating audio sources to geographic regions.

Figure 14:
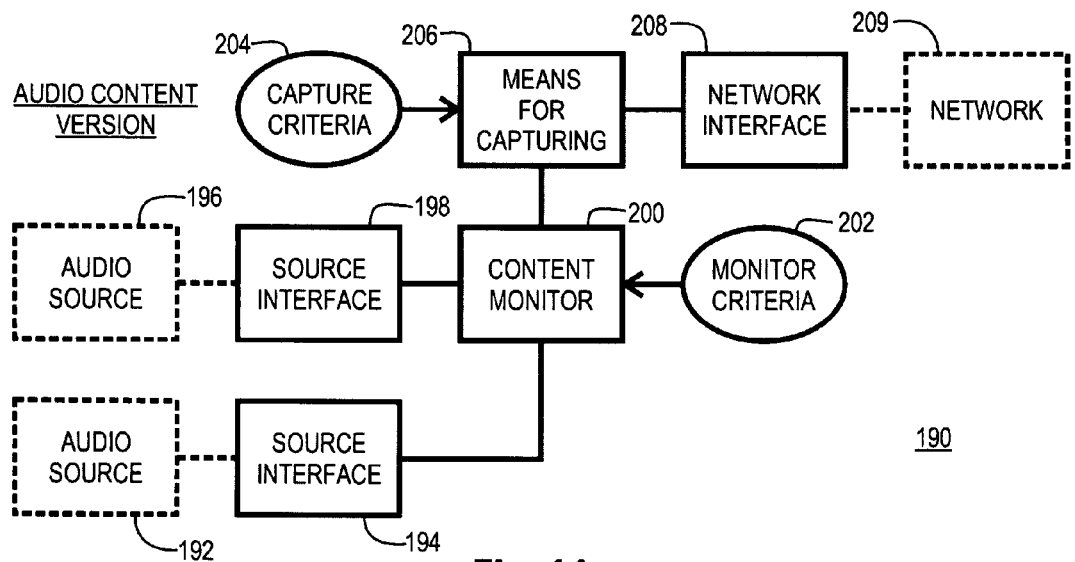
FIG. 14 is a functional block diagram of a network audio feed source according to an illustrative embodiment of the present invention.

Reference is directed to FIG. 14, which is a functional block diagram of a network audio feed source according to an illustrative embodiment of the present invention. The NAFS 190 depicted in FIG. 14 is a functional block diagram of a NAFS configured to couple plural local audio sources 192, 196 into a network 209, such as the Internet. The audio sources 192, 196 may be any of the types discussed herein or may be any other audio source, with or without pertinence data, which are known to those skilled in the art. The plural audio sources are coupled to respective 194, 198 source interfaces. The source interfaces couple audio signals, either analog or digitally encoded, and pertinence data from the audio sources into the NAFS 190 of the illustrative embodiment. The content is coupled from the source interfaces 194, 108 to the content monitor 200. The content monitor 200 monitors the output from the source interfaces for the presence of content that satisfies predetermined monitory criteria 202. Monitoring criteria can be user defined, pre-entered during manufacture, or entered upon initial configuration of the NAFS by a service provider, or may be entered through other means, such as via commands received through the network 209. Essentially, the monitor function is the detection of content arriving from the audio source. With respect to an analog input, the use of a squelch gate can be employed to distinguish content from background noise. It should be noted that in the case of a continuous feed audio source, the content stream from the audio source is assumed to be continuous, so the content monitor directly couples the continuous feed to the means for capturing 206.

In the case of the digital audio source and in the case where pertinence data is used as a monitor criteria, then the content monitor 200 and monitor criteria 202 operate in the digital domain. Specific data fields may be compared to detect the presence of content, either audio or pertinence data. In any event, when the content monitor 200 detects the presence of content in accordance with the monitor criteria 202, then that content is coupled to the means for capturing 206. The means for capturing 206 selectively captures content that corresponds to predetermined capture criteria 204. Capturing means performing some process in the content in response to satisfaction of the predetermined capture criteria. If the content is in a suitable format for direct coupling into the network 209, then that content can be coupled to the network interface without modification. In other circumstances, the content will require modification to comply with network protocol requirements. If the content is analog, then an analog to digital conversion is performed. If the content is converted to digital, or is presented from the content monitor in digital format, a protocol conversion may be required. For example, digitized audio may be compressed to conserve bandwidth into the network, such as from a .WAV file format to a .OGG or .MP3 format, as are known to those skilled in the art. Also, the means for capturing 206 formats the audio into network compliant packets, including the requisite network overhead and addressing fields. Such conversion and formatting is known to those skilled in the art.

The capture criteria 204 applied to the capture process 206 in FIG. 14 presents a variety of opportunities for selective inclusion of audio content and pertinence data into the content fed into the network 209. While the audio sources coupled to the NAFS 190 may feed a wide range of content, all of which meets the monitor criteria 202, the user or system preferences can be more narrowly defined though application of the capture criteria 204. For example, where the audio source is a trunked radio system carrying traffic for a large number of talk groups, the capture criteria can be limited to a small subset of those talk groups, such as the local police and fire service dispatch channels. The nature of the capture criteria varies over a broad range of options that are related to the type of audio source involved and the desires of the user.

Figure 15:
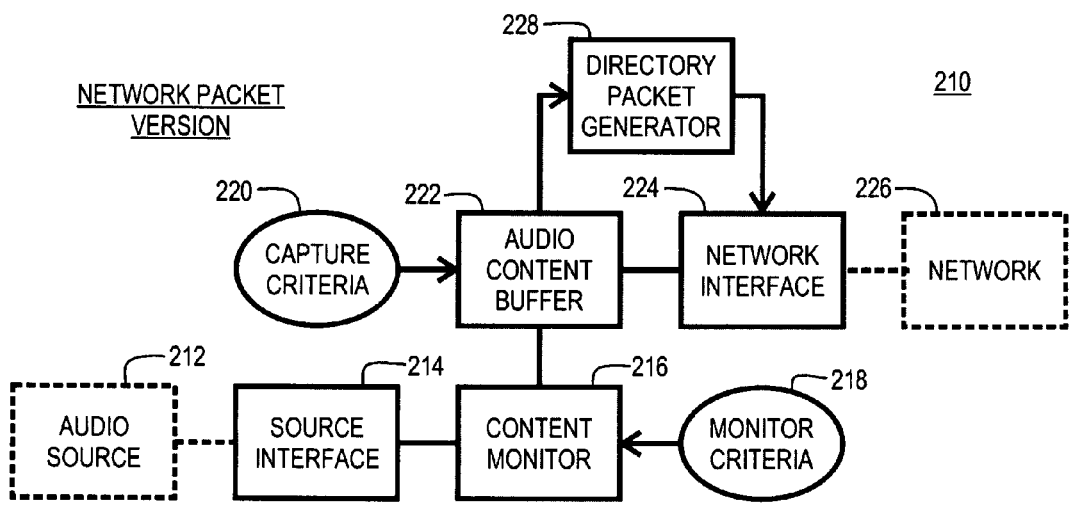
FIG. 15 is a functional block diagram of a network audio feed source according to an illustrative embodiment of the present invention.

Reference is directed to FIG. 15, which is a functional block diagram of a network audio feed source according to an illustrative embodiment of the present invention. The feed source terminal 210 in FIG. 15 is adapted to buffer audio content and sends directory packets into the network 226. Other network receive terminals receive the directory packets and then send audio packet requests to the feed terminal 210. In response to receipt of these audio packet requests, the feed terminal 210 recalls the corresponding buffered audio packets and communicates them into the network. In particular, any type of audio source 212 is coupled to an audio source interface 214 in the terminal 210. The same types of audio sources and source interfaces discussed above apply to the terminal 210 in FIG. 15. Similarly, a content monitor 216 monitors for audio content in accordance with monitor criteria 218. The means for capturing of FIG. 14 is replaced with an audio content buffer 222 in FIG. 15. The decision to buffer particular content is determined by applying capture criteria 220 to the buffering process. Again, the type of capture criteria is the same is discussed above, as well as the digitization and protocol conversion aspects of the capture process. The audio content buffer stores the captured audio content in a network addressable memory structure and forwards the address or indicia of address and pertinence data to a directory packet generator 228 in the feed source terminal 210 of the illustrative embodiment. The directory packet generator 228 assembles a directory stream of packets and couples them to the network 226 through the network interface 224. The details of the directory packet and directory stream generation process are more fully described in co-pending U.S. patent application Ser. No. 11/600,476 to Sullivan et al. filed on Nov. 16, 2006 ("Sullivan-1") for a Network Audio Directory Server and Method, the contents of which has been incorporated by reference.

The stream of directory packets output to the network 226 by the directory packet generator 228 are received by various other network terminals (not shown), including NART terminals. If the directory packets meet the selection criteria in such receive terminals, then those terminals will forward an audio packet request back to the feed source terminal 210 through the network. Again, refer to Sullivan-1 for further details about the packet protocols. Upon receipt of the audio packet request by the network interface 224, the request is handed to the audio content buffer 222, which recalls the requested audio content according to the requested network address. This audio content is then returned to the requesting terminal through the network 226 via the network interface 224. The buffering, packet generation, and interface functions can be accomplished using any of a variety of software environments known to those skilled in the art and running on dedicated hardware or in conventional computing or wireless devices.

Figure 16:
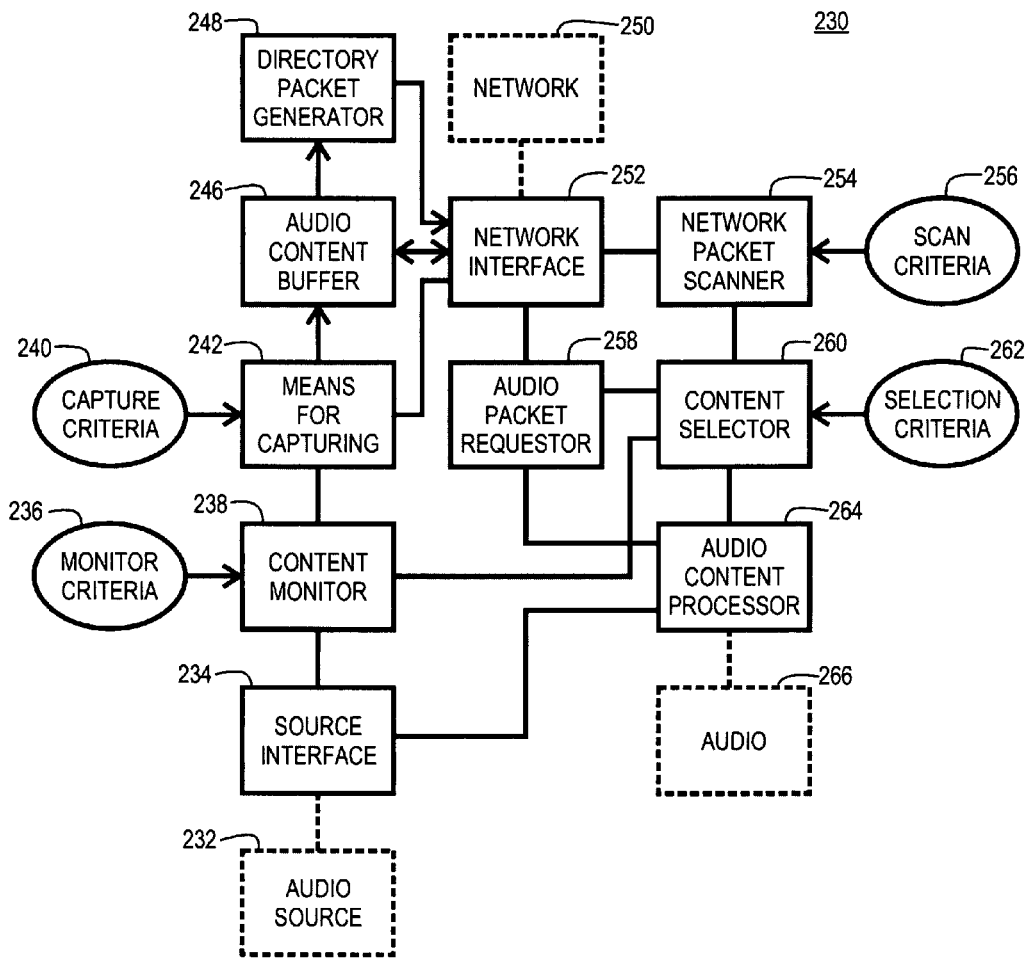
FIG. 16 is a functional block diagram of a combined network audio feed source and receive terminal according to an illustrative embodiment of the present invention.

Reference is directed to FIG. 16, which is a functional block diagram of a combined network audio feed source and receive terminal 230 according to an illustrative embodiment of the present invention. While the receive terminal and feed source functions and structures are discussed individually herein, in this illustrative embodiment, they are combined into a single terminal devices. Such a device is highly useful in building network-wide audio content generation and consumption. It also enables individual users to access network audio content and local audio content as desired, while still contributing their local audio content back into the network for other users to access. The two terminal functions are joined in FIG. 16 at the network interface 252, which provides access to a network 250, such as the Internet. The feed source portion of the combined terminal 230 is coupled to a local audio source 232 via a source interface 234. The source interface 234 couples audio content and pertinence data, if available, to a content monitor 238. For the direct reproduction of local audio content, the source interface 234 is also coupled to the audio content processor 264 of the receive terminal side of the terminal 230 for direct audio reproduction 266. The content monitor 238 monitors for audio content received through the source interface 234 in accordance with predetermined monitor criteria 236, as has been discussed hereinbefore. Note that for the situation where the local audio includes pertinence data, the content monitor 238 is coupled to the content selector of the receive terminal side of the terminal 230 so as to enable the content selection 260 process to include pertinence data.

Now, continuing with the feed source description of the combined terminal 230, upon satisfaction of the monitor criteria 236, content is passed to the means for capturing 242. Content is captured if it satisfies the capture criteria 240, as has been described hereinbefore. The terminal 230 in FIG. 16 is adapted to produce directory packets as well as audio packets, so the captured content from the means for capturing 242 is optionally passed to an audio content buffer 246 for buffering according to a network addressable data structure. Alternatively, the captured audio content can be communicated directly into the network 250 via the network interface 252 from the means for capturing 242. This coupling would be appropriate for steaming audio sources and intermittent audio sources. Again, the remarkable flexibility of the terminal architecture will be appreciated by those skilled in the art. Now, in the case where the terminal 230 is configured to generate a directory packet stream for a particular audio source, the audio content is buffered in the audio content buffer, which is coupled to the directory packet generator 248. The directory packet generator 248 assembles a directory packet stream including the buffer addresses of the audio content and the requisite pertinence data for the individual directory packets. These are passed to the network via the network interface 252. Corresponding audio packet requests received back through the network are received by the network interface 252 and coupled to the audio content buffer 246, where the reply audio content is recalled and sent back through the network interface 252.

With respect to the receive terminal functions of the combined terminal 230 in FIG. 16, network audio packets and network directory stream packets are received from the network 250 via the network interface 252 and passed to the network packet scanner 254. The network packet scanner 254 scans received network packets in accordance with predetermined scan criteria 256, as have been discussed hereinbefore. Pertinent portions of the scanned packets are passed to the content selector 260, which selects a portion of the scanned content in accordance with predetermined selection criteria, as have been discussed hereinbefore. In the case where a directory packet is selected by the content selector 260, the network address of the selected packets are passed to the audio packet requestor 258, which couples a corresponding audio packet request into the network 250 via the network interface 252. The returned audio content is passed from the network interface 252 to the audio content processor 264 by the audio packet requestor 258. Note that the content selector 260 can also receive locally sourced content from the content monitor 238 on the feed source side of the combined terminal 230. With respect to content selected in the content selector function block 260, it is passed to the audio content processor 264, which operates in the manner described above. The audio may be reproduced as acoustic audio 266. Note that the source interface 234 may couple local audio directly to the audio content processor for immediate reproduction as acoustic audio 266.

Figure 17:
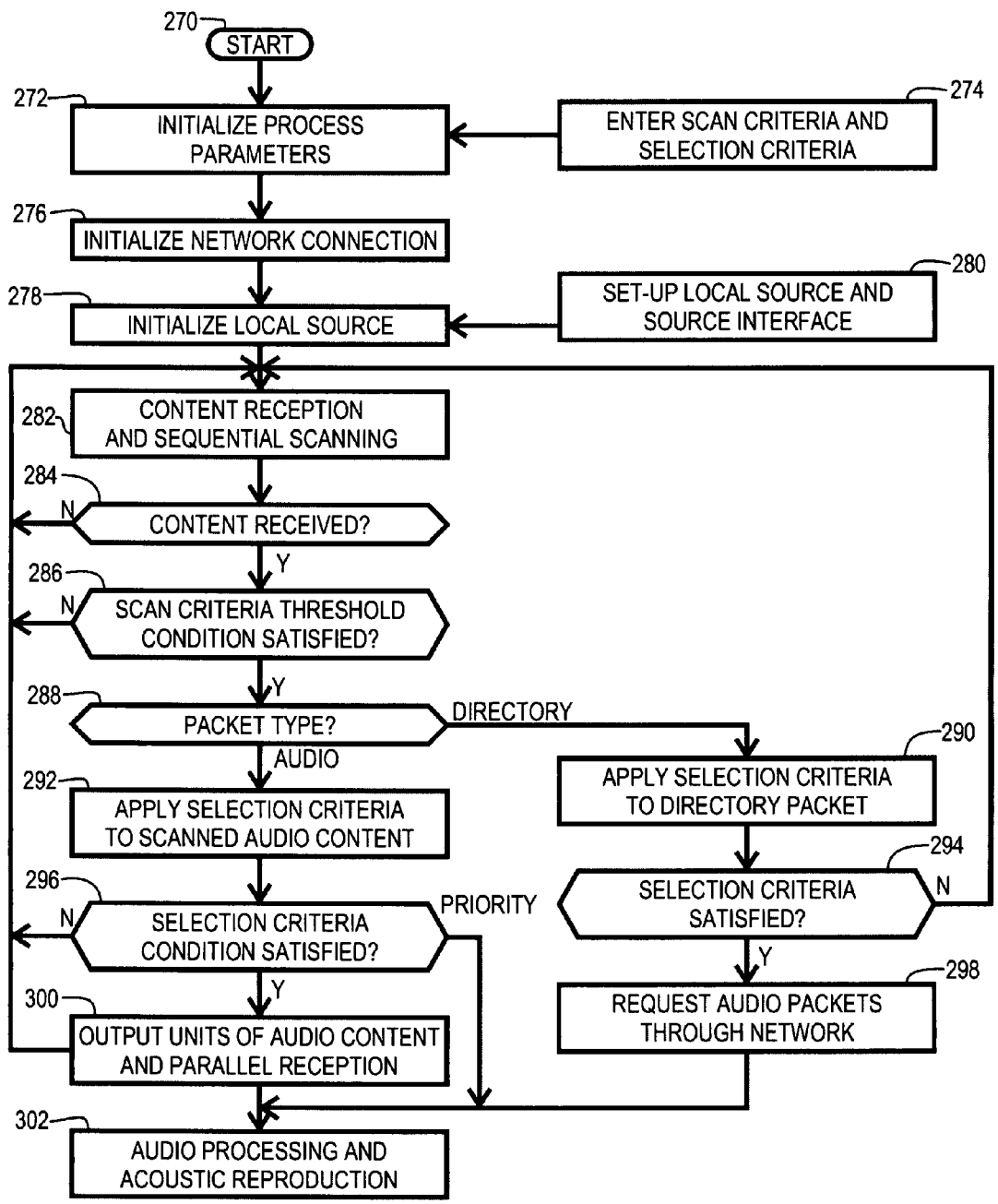
FIG. 17 is a process flow diagram of a network audio receive terminal according to an illustrative embodiment of the present invention.

Reference is directed to FIG. 17, which is a process flow diagram of a network audio receive terminal according to an illustrative embodiment of the present invention. The process begins at step 270 and proceeds to step 272 where the initialization of the process and variables occurs, including the specification of audio sources and source addresses. In addition, the predetermined scan criteria and selection criteria 274 are input at step 272, but may be changed from time to time by the user or through network operation. The network interface is initialized at step 276. In the case of an Internet connection, the TCP/IP addressing protocols are employed. At step 278, the local audio source is initialized, if such a source is present. This includes setting up the source interface 280, including programming the local source, such as a scanning radio receiver, and entering pertinence data is such data is employed. At step 282, the content reception and sequential scanning operation of audio content and pertinence data commences. If content is received at step 284, then the scan criteria threshold test occurs at step 186. If content is not received at step 284 or the threshold test is not satisfied at step 286, then the process returns to the top of the content reception loop at step 282. On the other hand, at step 286, if the scan threshold is satisfied, then the process continues to step 288 for a determination of the packet type received. Directory packets are processed in a sub-loop of steps 290, 294, and 298, which process the audio packet request and handling.

The directory packet handling procedure involves applying directory packet selection criteria to the received packet, based on the address or pertinence data only, as there is no audio content. If the selection criteria are satisfied at step 294, then an audio packet request is generated and sent into the network at step 298, and the received audio content is processed at step 302, discussed below. On the other hand, at step 294, if the selection criteria for the directory packet are not satisfied at step 294, then the process returns to the top of the content loop at step 282. Now, returning to step 288, if the packet type is an audio content packet, then flow proceeds to step 292. At step 292, the selection criteria are applied to the audio packet, which may comprise audio content, addresses, and pertinence data. If the criteria are not satisfied, then the process returns to the top of the audio content loop at step 282. If the selection criteria are satisfied at step 296, ten from proceeds to step 300, where the audio content is further processed. Note that at step 296, the audio content selection criteria may indicate that "priority" content has been received. In this case, the content is routed directly to the audio processing step 302 for immediate reproduction. Parallel processing of content is routed to a buffer for later reproduction after the priority content has been handled. At step 300, routine levels of priority are handled according to predetermined selection criteria, which is generally organized chronologically. The audio content is buffered at step 300 and output to the audio processing step 302 as reproduction and time compression allows. Note that the audio content loop returns from step 300 to step 282 for continuing content reception and scanning, as the reproduction process of step 302 occur outside of the audio content monitoring loop.

Figure 18:
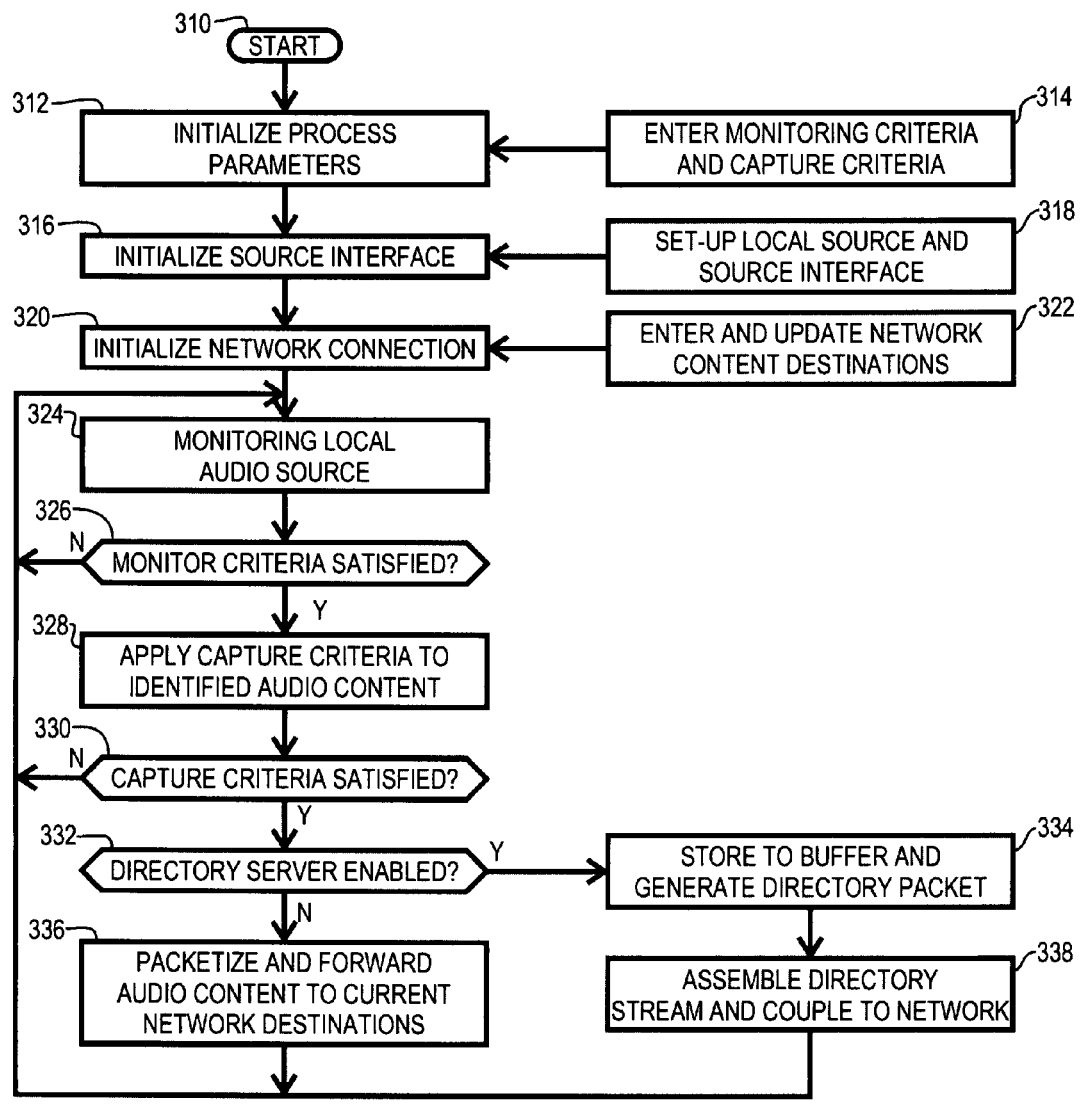
FIG. 18 is a process flow diagram of a network audio feed source according to an illustrative embodiment of the present invention.

Reference is directed to FIG. 18, which is a process flow diagram of a network audio feed source according to an illustrative embodiment of the present invention. The feed source process begins at step 310 and proceeds to step 312 where the processes are initialized, including input of the predetermined monitoring and capture criteria 314. These criteria can be entered locally by the user, through the local source, or through the network. At step 316, the local source is initialized, including programming the local source, the source interface, and entering any requisite pertinence data at step 318. The network connection is initialized at step 320, including entry of any predetermined network destination for gathered content, such as directory servers, network buffering terminals, and so forth. The audio content monitoring loop commences at step 324 where the process begins monitoring the content output from the local source to the network audio feed source terminal. Step 326 is a test for the satisfaction of the monitor criteria. IF it is satisfied, then the process proceeds to step 328 where the capture criteria are applied to the monitored content, which can be applied to the audio content and pertinence data. If the monitor criteria at step 326 or the capture criteria at step 330 are not satisfied, then the process returns to the top of the content loop at step 324. On the other hand, at step 330, if the capture criteria are satisfied at step 330, then the process continues to step 332. Step 332 determines whether the present audio content is to be sent directly out onto the network, or whether it is to be buffered and output as a directly packet streams.

At step 332, a test to determine whether the directory server function is enabled for the present content is conducted. If it is, then the process proceeds to step 334 where the audio content is stored to a buffer and the directory packet including the address of the content and the requisite pertinence data is generated. At step 338, the directory stream is communicated to the network. On the other hand, at step 332, if the directory server function is not enabled for the present content, then flow proceeds to step 336. At step 336, the audio content, address and pertinence data are packetized and forwarded into the network to the predetermined network destinations. The process returns from either of step 338 or step 336 to the top of the content loop at step 324. In some situations, it is desirable for a facility monitoring radio frequency transmissions to monitor multiple radio frequencies from the same site. For example, a NAFS may capture and feed transmissions from multiple agencies in the same geographic region, or feed transmissions from multiple working channels in a trunked radio system. To monitor and optionally capture intermittent transmission traffic carried on radio frequency signals, the NAFS may be equipped with a radio frequency receiver, and monitor the output signals from this receiver. When multiple audio channels are to be monitored, the NAFS may be equipped with one radio receiver configured to scan the channels to be monitored, or the NAFS may be equipped with multiple separately tuned receivers.

Individual audio channels will be active for only a fraction of the time, and therefore it is possible to use a single receiver to monitor multiple channels. When this is done, however, some transmissions may be partially or wholly missed due to collisions, a circumstance where more than one channel is simultaneously active and information on an unmonitored channel is not buffered. For complete coverage, it may be desirable to use a single dedicated receiver for each radio frequency channel to be monitored at a feed source.

However, the number of receivers may be reduced while still preserving a complete record of transmissions under ordinary circumstances, by dynamically changing the scanning properties of free receivers (those not currently receiving a signal, or in a hold state to capture responses to a recent transmission) so that these free receivers selectively scan those channels to be monitored that are not currently being monitored by another receiver. In such a circumstance, these separately tuned receivers may be provided with a common control system, for commanding the tuning of these receivers. For example, such a control system could operate on a microcontroller or personal computer, equipped with a suitable number of communications channels for providing digital command data to each of the receivers, either through multiple ports, multiplexer, or addressable receiver identifications on a common data bus. A mix of these two methods, dedicated receivers on specific channels and scanning receivers on other channels, may be desirable in circumstances where certain radio frequency channels have an unusually high amount of activity (for example, working channels in a trunked radio system) or have a high priority (for example, a primary police dispatch channel in a major city).

The device operating the common control system would maintain a list of audio channels or broadcast frequencies that are to be monitored, identified by radio frequency or talk-group identification code. When a receiver is actively receiving communications on an audio or working channel, the control system would identify this channel by knowledge of the tuning command issued to this receiver or information transmitted from the receiver about its current tuning (suitable for identifying audio channels on conventional radio systems or working channels on trunked radio systems). In the case of identifying trunked audio channels, such information may be combined with information obtained from a trunking control channel associating audio and working channels.

The control system would maintain a dynamic list of channels to be monitored for which signals are not currently being received, this list effectively being those channels on which new transmissions should be detected. When a receiver starts capturing signal on a channel on this list, the channel would be suspended or removed; conversely, when a receiver stops capturing signal on a channel to be monitored, the channel would be restored or added to the dynamic list. Such a dynamic list may evidently be implemented through the inverse operation of maintaining the complementary list of channels being received, and effectively skipping these channels when consulting a master list of channels to be monitored. The point at which a receiver is deemed to have stopped capturing signal on a channel may be coincident with an end of transmission, or the system may be configured with a hold time so that the receiver is held on this channel for a certain duration to monitor for replies or other follow-up activity on the same channel, in which case the receiver would not be freed immediately on end of transmission and the channel would still be deemed monitored and hence excluded from the dynamic list.

Receivers not currently receiving signal are free to detect new transmissions, and would be dynamically assigned sets of channels to scan for new transmissions, so as to exclude channels already being monitored by receivers currently receiving signals. Scanning may be implemented through a receiver's internal scan function, where a list of channels is presented for scanning and the tuning of the receiver is internally governed, or scanning may be implemented through the issuance of direct tuning commands from the common control device. For simplicity, all scanners may be operative on the entire dynamic list. However, for load balancing, and for minimizing gaps between samples for signal on individual channels, it is desirable to partition the dynamic list into separate scan lists for each receiver.

The control system may flag specific audio channels as having higher priority for monitoring, create scan lists of unequal size for different receivers, and selectively distribute higher priority channels so that they appear on scan lists that are shorter than average. This makes it more likely that transmissions on higher priority channels will be detected more promptly, since the interval between signal sample tests would be shorter on higher priority channels. Different receivers may have different band limitations, and some receivers may be unable to tune all frequencies in the dynamic list, so a partition of channels into scan lists may take such practical limitations into account. In addition, it may be desirable to reduce the switching of bands in a multi-band receiver, due to time latencies involved in the switching process, in which case a scan list may be designed to reduce the number of bands currently scanned on a receiver, or order a scan list so that band switching is minimized.

When total activity increases on the channels being monitored, more receivers are actively engaged in monitoring signals, and fewer receivers are free for detecting new transmissions. In this case, partitioned scan lists for each free receiver would become longer, and the expected delay between the start of a new transmission and detection of this transmission would increase. However, excepting this latency time, coverage of the monitored channels would remain complete until all free receivers are engaged in the monitoring of specific detected signals. In this manner, the number of receivers required to maintain complete monitoring coverage of a set of radio frequency broadcast channels would be minimized. Such a method is evidently useful in the context of NAFS terminals, and also for logging systems recording activity patterns on broadcast channels, or terminals that locally capture audio content from broadcast channels without operating as an active feed source.

When distributing radio frequencies to scan lists for multiple receivers, to implement effective load balancing, it may be useful to distribute the channels so the expected rate of transmission activity on the scan lists is approximately balanced. For this purpose, frequencies may be assigned a score in the standard metric of Erlangs, representing the fraction of time that a given frequency has active transmissions. The sum of Erlang scores for the frequencies in a specific scan list corresponds to the mean wait time until a transmission event occurs on some frequency within that scan list, that is, the mean wait time during which scanning is possible until a receiver becomes occupied with transmission capture. An Erlang score for monitored frequencies may be determined by summing the durations of detected transmissions on that frequency and dividing by the total system time during which this summation was determined.

In an illustrative example of a multi-receiver NAFS configuration, in a first step, a control system (for example, software operative on a Linux computer) is programmed with a list of radio frequencies to monitor, and a master list of programmable frequency agile radio scanners connected to the control system, together with addressing identifiers for communications with each scanner. An example of such a programmable scanner is the Uniden BCT15 receiver, and an example of an addressing identifier is a serial port number or device name. In a second step, the control system partitions the master list into a group of receiver scan lists, of equal number to the number of addressable frequency agile radio receivers, where each scan list has approximately the same number of entries. In a third step, the control system sends programming commands to each addressable frequency agile radio receiver, configuring the receiver into a scan mode, with an operative scan list identical to one of the receiver scan lists. In a fourth step, the control system monitors for a signal detection report from a scanner, of either of two types, indicating the start or end of a detected transmission.

Upon detection of a start of transmission, in a fifth step, the control system distributes the frequencies on that receiver's scan list, excepting the frequency to which the receiver is presently tuned, among the other frequency agile radio receiver scan lists (for scanners not presently detecting signals), including the issuance of programming commands to these scanners updating their active scan lists. Upon detection of an end of transmission, in a sixth step, the control system removes frequencies from the active scan lists of currently scanning frequency agile radio receivers, and allocates these to the scan list of the newly free frequency agile radio receiver, so that the number of channels on each active scan list is approximately balanced, including the issuance of programming commands to these scanners updating their active scan lists.

Optionally, if certain radio frequencies are marked as priority channels, they may be assigned to dedicated radio receivers that do not scan multiple frequencies. Similarly, if any of the monitored frequencies belong to a trunked radio system, a dedicated radio receiver may monitor the corresponding control channel to determine associations between audio channels and monitored broadcast frequencies. During operation of a multi-receiver activity monitoring system, audio transmissions detected by these frequency agile radio receivers may be captured and processed as described herein for NAFS terminals, including the capture of audio, and the transmission of audio packets and pertinence data.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A network audio receive terminal apparatus, comprising:
    a network interface for receiving network packets from a network, including a stream of directory packets indicating the capture of an intermittent stream of related audio transmissions, wherein a directory packet contains an audio content storage address and related pertinence data, and wherein said pertinence data includes at least one of; a radio channel identifier, a talk group identifier, or a public service agency descriptor;
    a network packet scanner coupled to said network interface that sequentially scans received network packets in accordance with scan criteria;
    a content selector coupled to said network packet scanner that selects packets from said scanned network packets based on selection criteria, which includes a portion of said pertinence data, and
    an audio packet requestor coupled to said content selector and said network interface, and operable to request audio packets through the network identified by the audio content addresses that correspond to said selected directory packets;
    an audio content processor coupled to said content selector, which processes the audio content in said selected network packets received from the network in response to said request for audio content, and
    a display coupled to said audio content processor that display a portion of said related pertinence data at the same time said audio content processor processes said audio content.

2. The apparatus of claim 1, and wherein:
    said audio packet requester operates to request audio packets in response to selection criteria that is based on a time index that is delayed in time.

3. The apparatus of claim 1 and wherein said network interface is a wireless transceiver.

4. The apparatus of claim 1 and wherein the network packets are Internet protocol compliant packets.

5. The apparatus of claim 1 and wherein said scanner sequences network packets by source address.

6. The apparatus of claim 1 and wherein said scanner sequences network packets by time.

7. The apparatus of claim 1 and wherein said scanner sequences network packets by predetermine priority.

8. The apparatus of claim 1 and wherein said scanner sequences network packets according to a data reference field.

9. The apparatus of claim 1 and wherein said selection criteria distinguishes units of audio content by signal quality.

10. The apparatus of claim 1 and wherein said selection criteria distinguishes units of audio content by source address.

11. The apparatus of claim 1 and wherein said selection criteria distinguishes units of audio content by user preferences.

12. The apparatus of claim 1 and wherein said selection criteria distinguishes units of audio content by packet data reference fields.

13. The apparatus of claim 1 and wherein a unit of audio content is an audio data file.

14. The apparatus of claim 1 and wherein said audio content processor includes a digital to analog converter.

15. The apparatus of claim 1 and wherein said audio content processor includes a memory buffer.

16. The apparatus of claim 1 and wherein said audio content processor includes a memory for storing a sequence of related units of audio content, and wherein:
    said audio content processor is operable to recall said sequence of related units of audio content from said memory and reproduce them in time ordered sequence.

17. The apparatus of claim 16 and wherein said time ordered sequence is compressed by removing a portion of the quite intervals between units of audio content.

18. The apparatus of claim 16 and wherein said audio content processor interrupts said time ordered reproduction sequence to reproduce audio content from a second audio source.

19. The apparatus of claim 1, further comprising:
a local source interface for connection to a local audio source, and coupled to said content selector, and wherein said content selector selects local audio content based on said selection criteria.

20. The apparatus of claim 19 and wherein said local source interface includes a data communication channel for communicating audio content related data with the local audio source.

21. The apparatus of claim 1, further comprising:
a user interface having a data entry actuator for entering scan criteria and selection criteria.

22. The apparatus of claim 1 and wherein said selection criteria are received by said network interface.

23. The apparatus of claim 1 and wherein said network packet scanner simultaneously scans network packets from plural sources.

24. The apparatus of claim 23 and wherein said audio content processor reproduces audio content from a first audio source while said network packet scanner continues to scan for network packets from a second audio source.

25. The apparatus of claim 24 and wherein said content selector selects one of plural simultaneous units of audio content based on priority data.

26. The apparatus of claim 25 and wherein said priority data is geographically based.

27. The apparatus of claim 1 and wherein said scan criteria includes user entered preference directing scanning sequences.

28. A method of receiving network audio content by a network terminal having a network interface, a display, and an audio content processor, comprising the steps of:
receiving network packets through the network interface, including a stream of directory packets indicating the capture of an intermittent stream of related audio transmissions, wherein a directory packet contains an audio content storage address and related pertinence data, and wherein the pertinence data includes at least one of; a radio channel identifier, a talk group identifier, or a public service agency descriptor;
sequentially scanning said received network packets in accordance with scan criteria;
selecting network packets from said scanned network packets based on selection criteria, which include a portion of the pertinence data; and
requesting audio packets through the network identified by the audio content addresses that correspond to the selected directory packets;
processing the audio content in said selected network packets received from the network in response to said requesting audio content step by the audio content processor, and
displaying a portion of the related pertinence data at the same time the audio content is being processed.

29. The method of claim 28, and wherein:
said selecting directory packets step is delayed in time.

30. The method of claim 28 and wherein said scanning step sequences network packets by source address.

31. The method of claim 28 and wherein said scanning step sequences network packets by time.

32. The method of claim 28 and wherein said scanning step sequences network packets by predetermine priority.

33. The method of claim 28 and wherein said scanning step sequences network packets according to a data reference field.

34. The method of claim 28 and wherein said selecting step distinguishes units of audio content by signal quality.

35. The method of claim 28 and wherein said selecting step distinguishes units of audio content by source address.

36. The method of claim 28 and wherein said selecting step distinguishes units of audio content by user preferences.

37. The method of claim 28 and wherein said selecting step distinguishes units of audio content by packet data reference fields.

38. The method of claim 28 and wherein said processing step includes digital to analog conversion.

39. The method of claim 28 and wherein said processing step include storing the audio content in a memory buffer.

40. The method of claim 28 and wherein said processing step further comprises:
storing a sequence of related units of audio content, and
reproducing said sequence of related units of audio content in time ordered sequence.

41. The method of claim 40, further comprising the step of:
compressing said time ordered sequence by removing a portion of the quite intervals between units of audio content.

42. The method of claim 40, further comprising the steps of:
interrupting said time ordered reproduction sequence, and
reproducing audio content from a second audio source.

43. The method of claim 28 and wherein a local audio source is coupled to the network terminal, and further comprising the step of:
selecting local audio content based on said selection criteria.

44. The method of claim 43, further comprising the step of:
communicating audio content related data with the local audio source.

45. The method of claim 28, further comprising the step of:
entering scan criteria and selection criteria into the network terminal.

46. The method of claim 28, further comprising the step of:
receiving said selection criteria through the network interface.

47. The method of claim 28, further comprising the step of:
simultaneously scanning network packets from plural sources.

48. The method of claim 47, further comprising the steps of:
reproducing audio content from a first audio source, and
simultaneously scanning network packets from a second audio source.

49. The method of claim 48, further comprising the step of:
selecting one of plural simultaneous units of audio content based on priority data.

\* \* \* \* \*